(12) United States Patent
Sato et al.

(10) Patent No.: US 12,052,722 B2
(45) Date of Patent: Jul. 30, 2024

(54) TERMINAL DEVICE

(71) Applicants: SHARP KABUSHIKI KAISHA, Sakai (JP); FG Innovation Company Limited, Tuen Mun (HK)

(72) Inventors: Seiji Sato, Sakai (JP); Hideo Nanba, Sakai (JP); Osamu Nakamura, Sakai (JP); Ryota Yamada, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 594 days.

(21) Appl. No.: 17/275,168

(22) PCT Filed: Sep. 10, 2019

(86) PCT No.: PCT/JP2019/035470
§ 371 (c)(1),
(2) Date: Mar. 10, 2021

(87) PCT Pub. No.: WO2020/054693
PCT Pub. Date: Mar. 19, 2020

(65) Prior Publication Data
US 2021/0368534 A1    Nov. 25, 2021

(30) Foreign Application Priority Data

Sep. 11, 2018 (JP) ................................. 2018-169582

(51) Int. Cl.
*H04W 72/23* (2023.01)
*H04L 1/00* (2006.01)
(Continued)

(52) U.S. Cl.
CPC ........... *H04W 72/23* (2023.01); *H04L 1/0003* (2013.01); *H04W 72/0453* (2013.01); *H04W 72/1268* (2013.01)

(58) Field of Classification Search
CPC ............. H04W 72/23; H04W 72/0453; H04W 72/1268; H04W 72/569; H04L 1/0003; H04L 1/0073
(Continued)

(56) References Cited

U.S. PATENT DOCUMENTS 9,451,631 B2 *  9/2016  Lee ................... H04W 72/1268
2017/0332386 A1 * 11/2017  Li ...................... H04W 72/0446
(Continued)

FOREIGN PATENT DOCUMENTS

CN       108029129 A     5/2018
CN       108207032 A     6/2018

OTHER PUBLICATIONS

Oppo, "Remaining issues on transmission collision", 3GPP TSG RAN WG1 adhoc_NR_AH_1801 R1-1800512, Jan. 13, 2018, [online], [retrieved on Nov. 12, 2019].
(Continued)

*Primary Examiner* — Kwang B Yao
*Assistant Examiner* — Syed M Bokhari
(74) *Attorney, Agent, or Firm* — ScienBiziP, P.C.

(57) ABSTRACT

The present disclosure includes a control unit that performs an uplink (UL) data transmission setting according to a radio resource control (RRC) message and a transmitting unit that transmits UL data according to the UL data transmission setting. The RRC message includes setting information of a plurality of configured UL grants (CGs). The setting information includes at least first and second CGs for each of at least one bandwidth part (BWP). The setting information further includes setting information related to transmission intervals for the first and second CGs. The control unit sets at least the first and second CGs for each BWP according to the setting information. The transmitting unit, when at least a part of the transmission interval of the first and second CGs
(Continued)

overlap each other, interrupts UL data transmission of the first CG to perform UL data transmission of the second CG.

12 Claims, 14 Drawing Sheets

(51) Int. Cl.
*H04W 72/0453* (2023.01)
*H04W 72/1268* (2023.01)
(58) Field of Classification Search
USPC .......................................................... 370/329
See application file for complete search history.

(56) References Cited

U.S. PATENT DOCUMENTS

| | | | |
|---|---|---|---|
| 2018/0139778 A1 | 5/2018 | Chou et al. | |
| 2018/0176937 A1* | 6/2018 | Chen | H04W 72/21 |
| 2019/0223036 A1* | 7/2019 | Lunttila | H04L 5/0094 |
| 2019/0253197 A1* | 8/2019 | Babaei | H04L 1/188 |
| 2019/0306921 A1* | 10/2019 | Wang | H04L 5/0048 |

OTHER PUBLICATIONS

3GPP TR 36.888, "3rd Generation Partnership Project; Technical Specification Group Radio Access Network; Study on provision of low-cost Machine-Type Communications (MTC) User Equipments (UEs) based on LTE (Release 12)", V12.0.0 (Jun. 2013).
3GPP TS 38.214, "3rd Generation Partnership Project; Technical Specification Group Radio Access Network; NR; Physical layer procedures for data (Release 15)", V15.1.0 (Mar. 2018).
Samsung, "Potential enhancement for UL grant-free transmission", R1-1808789, 3GPP TSG RAN WG1 Meeting #94 Gothenburg, Sweden, Aug. 20-24, 2018.
3GPP TR 45.820, "3rd Generation Partnership Project; Technical Specification Group GSM/Edge Radio Access Network; Cellular system support for ultra-low complexity and low throughput Internet of Things (CIoT) (Release 13)", V13.0.0 (Aug. 2015).
Vivo, "Remaining issues on UL data transmission procedure", R1-1800204, 3GPP TSG RAN WG1 Meeting AH 1801, Vancouver, Canada, Jan. 22-26, 2018.

* cited by examiner

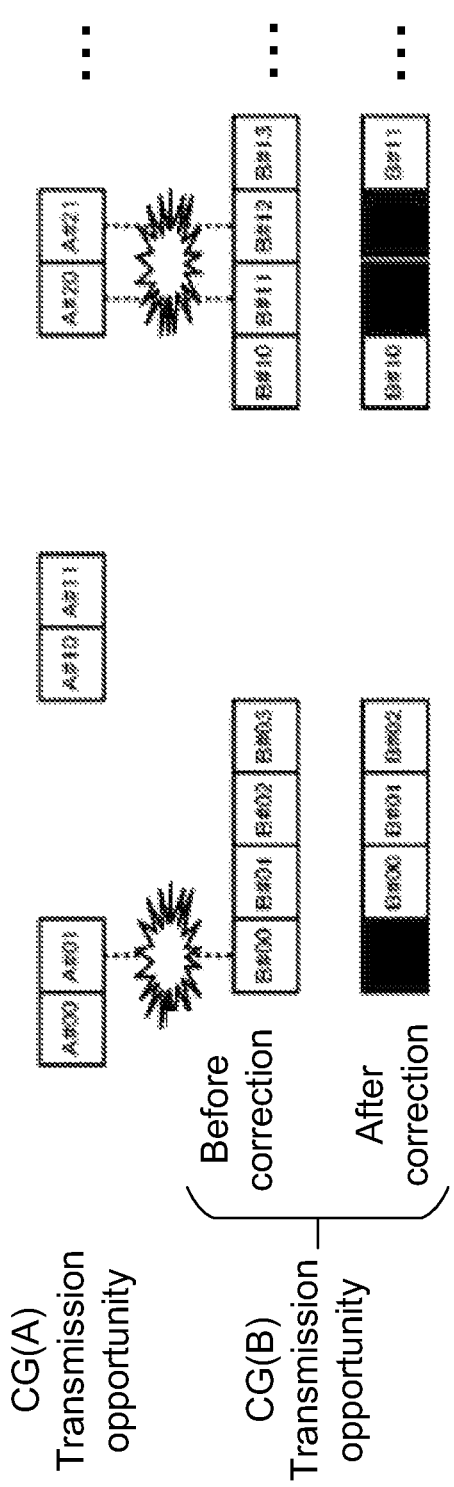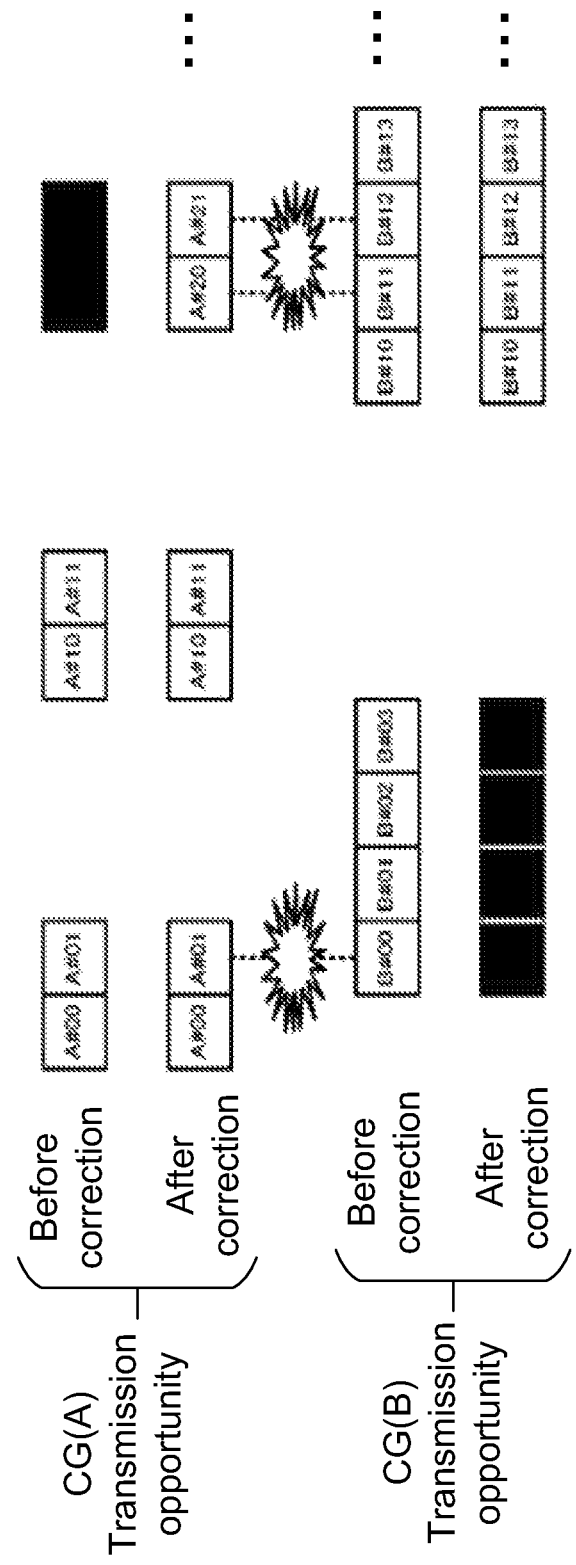
Fig. 11
Fig. 12

- CoonfiguredLength: 6
- repK: 4
- repK-RV: 0231 (numRV: 4)

Transmission opportunity a

Transmission opportunity b

Transmission opportunity c

Transmission opportunity d

• CoonfiguredLength: 4
• repK: 8
• repK-RV: 0231 (numRV: 4)

• CoonfiguredLength: 2
• repK: 4
• repK-RV: 0231 (numRV: 4)

TERMINAL DEVICE

FIELD

The present disclosure relates to a terminal device. The present disclosure claims the benefit of and priority to Japanese Patent Application No. 2018-169582 ("the '582 application"), filed on Sep. 11, 2018. The content(s) of the '582 application are fully incorporated herein by reference for all purposes.

BACKGROUND

In recent years, the fifth generation mobile telecommunications system (5G) has been attracting attention. It is expected to realize MTC (mMTC; Massive Machine Type Communications), ultra-high reliability/low latency communications (URLLC), and enhanced Mobile Broadband (eMBB) based on a plurality of terminal devices, and the communications technologies is standardized. In 3GPP ($3^{rd}$ Generation Partnership Project), the NR (New Radio) is studied as a 5G communications technology, and the NR multi-access (MA) is being discussed.

It is expected that the 5G technology realizes IoT (Internet of Things) connecting various devices that are not presently connected to network, and the realization of mMTC is also one of the important elements. In 3GPP, communications technologies of M2M (Machine-to-Machine) and MTC (Machine-Type-Communication) accommodating a terminal device for transmitting and receiving small-sized data have been standardized (Non-Patent Literature 1). Furthermore, to support data transmission at a low rate in a narrow band, NB-IoT (Narrow Band-IoT) has been standardized (Non-Patent Literature 2). 5G is expected to realize terminal devices that accommodate more than these standards and accommodate IoT devices that require ultra-reliability and low-latency.

On the other hand, in communications systems, like LTE (Long Term Evolution) and LTE-A (LTE-Advanced) standardized by 3GPP, a terminal device (UE: User Equipment) uses a random access procedure or scheduling request (SR) to request a base station device (BS or eNB: evolved Node B) for a radio resource for transmitting uplink data. The base station device, based on the SR, gives an uplink transmission grant (UL Grant) to each terminal device. The terminal device, after receiving the UL Grant of the control information from the base station device, transmits uplink data using predetermined radio resources based on uplink transmission parameters included in the UL Grant (may also be referred to as scheduled access, grant-base access, transmission by dynamic scheduling, hereinafter referred to as scheduled access). As such, the base station device controls all uplink data transmissions (the base station device controls the radio resources of the uplink data transmitted by each terminal device). In the scheduled access, the base station device controls an uplink radio resource, and thereby, realize an orthogonal multiple access (OMA).

The following problem may exist: in the 5G mMTC, if scheduled access is used, the amount of control information increases. Furthermore, there is the following problem: if scheduled access is used in the URLLC, the delay is lengthened. Therefore, the studies have been performed on the efficient use of: the terminal device does not perform a random access procedure or SR transmission, and does not perform UL grant receiving but performs the grant-free access (also referred to as grant-less access, contention-based access, autonomous access, or resource allocation for uplink transmission without grant, configured grant type 1 transmission etc. hereinafter referred to as grant-free access), and semi-persistent scheduling (SPS, configured type 2 transmission) (Non-Patent Literature 3). In the grant-free access, even when multiple devices transmit small-sized data, the increase in overhead due to control information may be suppressed. Furthermore, in the grant-free access, since receiving of the UL Grant is not performed, the time from the generation to the transmission of transmission data may be shortened. Furthermore, in the SPS, through transmission parameters that is a part of the control information notified by a higher layer, and through an activated UL Grant indicating usage grant of periodic resource and transmission parameters not notified by a higher layer, notification is performed, and thereby, data transmission is performed.

Furthermore, in the grant-free access, the study has been performed on switching to scheduled access using a grant when retransmission. The study introduces the process identifiers (process IDs, PIDs), so that a plurality of process of the grant-free access and retransmission scheduled access can be used. The study has been performed on, when the grant-free access data transmission, the association of a PID and a radio resource of time or frequency used in the grant-free access is established.

Furthermore, in the 3GPP NR specifications, one serving cell can be set with at most four BWPs (Bandwidth Part), and the subcarrier interval and bandwidth can be set for each BWP. Therefore, a wideband BWP can be used in eMBB, a narrowband BWP can be used in mMTC, and a BWP with large subcarrier interval (short OFDM symbol length) can be used in URLLC. BWP can be dynamically switched according to DCI format 0_1 and DCI format 1_1.

Furthermore, in the URLLC, a study has been performed not only on ensuring the high reliability of data but also high reliability of control information (PDCCH) of UL Grant or DL Grant. For example, the study introduces a compact DCI format that can transmit UL Grant or DL Grant at a low coding rate. The DCI format with a large number of information bits when compared with the DCI format with a small number of information bits, and the aggregation level is constant, has a higher coding rate. From such, a study has performed on setting the compact DCI format as a DCI format having a number of information bits smaller than the existing DCI formats 0_0 and 1_0. Herein, DCI formats 0_0 and 1_0 generally have a smaller number of information bits than DCI formats 0_1 and 1_1.

PRIOR ART DOCUMENTS

Non-Patent Literature

Non-Patent Literature 1: 3GPP, TR36.888 V12.0.0, "Study on provision of low-cost Machine-Type Communications (MTC) User Equipments (UEs) based on LTE," June 2013

Non-Patent Literature 2: 3GPP, TR45.820 V13.0.0, "Cellular system support for ultra-low complexity and low throughput Internet of Things (CIoT)," August 2015

Non-Patent Literature 3: 3GPP, TS38.214 V15.1.0, "Physical layer procedures for data (Release 15)," March 2018

SUMMARY

Problems to be Addressed

When a plurality of configured uplink grants are set for one serving cell or BWP, the following problems exist:

competition among resources for transmission may occur, which prevents normal transmission of uplink data.

An implementation of the present disclosure is made in view of the above circumstances, and objects to provide, even when a plurality of configured uplink grants are set for one serving cell or BWP and competition among resources for transmission occurs, a base station device, a terminal device, and a communications method is able to perform normal uplink data transmission.

Technology Aspects

In order to address the above-described problems, configurations of a base station device, a terminal device, and a communications method according to an implementation of the present disclosure are described in detail in the following paragraphs.

(1) The present disclosure objects to address the above-described problem. An implementation of the present disclosure provides a terminal device of a communication system including at least a base station device and a terminal device, wherein the terminal device comprises: a control unit that performs an uplink data transmission setting according to an radio resource control (RRC) message from an RRC; and, a transmitting unit that transmits uplink data according to the uplink data transmission setting; the RRC message includes setting information of a plurality of configured uplink grants, the setting information includes at least a first and a second configured uplink grants for each bandwidth part (BWP), the setting information for the plurality of configured uplink grants includes setting information of transmission intervals for the first and the second configured uplink grants, the control unit sets a plurality of configured uplink grants for each BWP according to the setting information of the plurality of configured uplink grants for each BWP included in the RRC message, the transmitting unit, when at least a part of the respective transmission intervals of the first and the second configured uplink grants overlap, interrupts one uplink data transmission of the first and the second configured uplink grants and performs uplink data transmission of the other.

Furthermore, an implementation of the present disclosure provides a terminal device, wherein the transmitting unit, after interrupting one uplink data transmission of the first and the second configured uplink grants, performing uplink data transmission of the other and completing the uplink data transmission of the other, resumes the interrupted uplink data transmission.

(3) Furthermore, an implementation of the present disclosure provides a terminal device, wherein the transmitting unit, after resuming the uplink data transmission of the interrupted configured uplink grant, performs the uplink data transmission until a transmission interval of the interrupted configured uplink grant ends.

(4) Furthermore, an implementation of the present disclosure provides a terminal device, wherein the transmitting unit, after resuming the uplink data transmission of the interrupted configured uplink grant, performs the uplink data transmission until a setting number of retransmission of the configured uplink grant is reached.

Furthermore, an implementation of the present disclosure provides a terminal device, wherein the control unit, when at least a part of the respective transmission intervals of the first and the second configured uplink grants overlap, according to the setting information of the plurality of configured uplink grants included in the RRC message, determines an order of which one to be interrupted; the transmitting unit, according to the order determined by the control unit, interrupts one uplink data transmission of the first or second configured uplink data transmission.

(6) Furthermore, an implementation of the present disclosure provides a terminal device, wherein the control unit determines the order according to a modulation and coding scheme (MCS) table setting or other parameters included in the setting information of the plurality of configured uplink grants.

(7) Furthermore, an implementation of the present disclosure provides a terminal device, wherein the control unit determines the order according to a setting order of the setting information of the plurality of configured uplink grants.

(8) Furthermore, an implementation of the present disclosure provides a terminal device, wherein the control unit determines the order according to a priority included in the setting information of the plurality of configured uplink grants.

Effects of the Invention

According to an implementation of the present disclosure, even when a plurality of configured uplink grants are set for one serving cell or BWP and competition among resources for transmission occurs, the uplink transmission data is able to be transmitted as normal.

BRIEF DESCRIPTION OF THE DRAWINGS

FIG. 11 is a schematic diagram of an example of transmission opportunity allocation of a plurality of configured uplink grants according to a third implementation of the present disclosure.

FIG. 12 is a schematic diagram of an example of transmission opportunity allocation of a plurality of configured uplink grants according to a fourth implementation of the present disclosure.

DESCRIPTION

Figure 1:
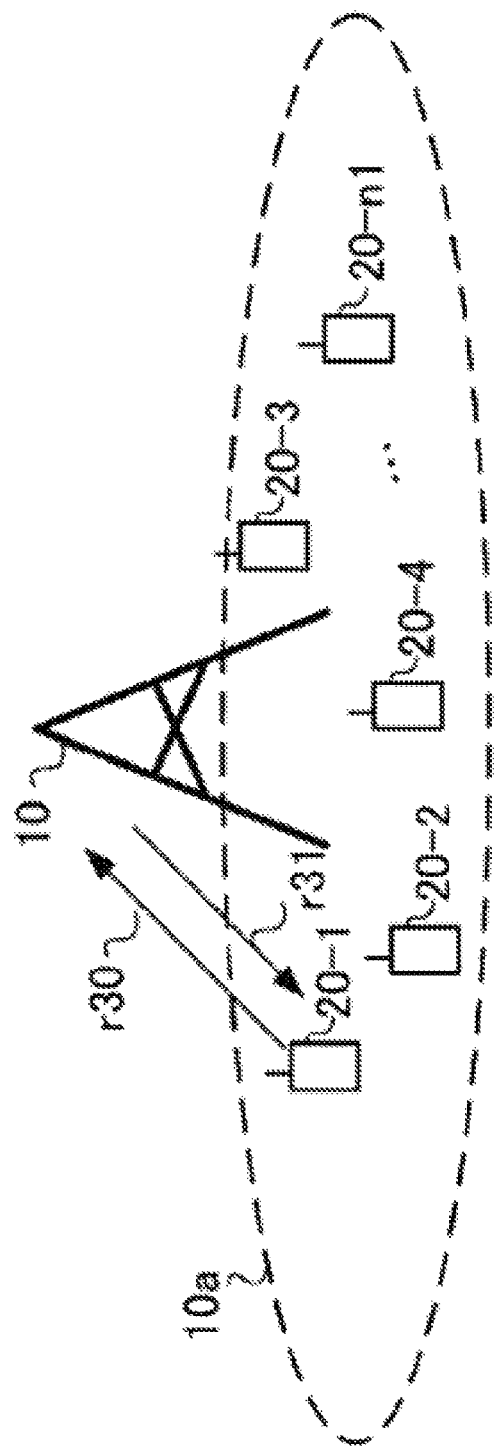
FIG. 1 is a schematic diagram of a communication system according to a first implementation of the present disclosure.

The communications system according to the present disclosure includes a base station device (may be referred to as cell, micro-cell, pico-cell, serving cell, component carrier, eNodeB (eNB), Home eNodeB, Low Power Node, Remote Radio Head, gNodeB (gNB), control station, Bandwidth Part (BWP), Supplementary Uplink (SUL)) and a terminal device (may be referred to as terminal, mobile terminal, mobile station, user equipment (UE)). In the communications system, in the case of downlink, the base station device becomes a transmitting device (transmitting point, transmitting antenna group, transmitting antenna port group), and the terminal device becomes a receiving device (receiving point, receiving terminal, receiving antenna group, receiving antenna port group). In the case of uplink, the base station device becomes a receiving device, and the terminal device becomes a transmitting device. The communications system may also be applicable to D2D (Device-to-Device) communications. In this situation, both the transmitting device and the receiving device become terminal devices.

The communications system is not limited to data communication between a terminal device and a base station device with a human intervention, but includes data communications that does not require human intervention applicable to MTC (Machine Type Communication), M2M communication (Machine-to-Machine Communication), IoT (Internet of Things) communications, NB-IoT (Narrow Band-IoT) (hereinafter referred to as MTC). In this situation, the terminal device is an MTC terminal. The communications system may use DFTS-OFDM (Discrete Fourier Transform Spread-Orthogonal Frequency Division Multiplexing), SC-FDMA (Single Carrier-Frequency Division Multiple Access), CP-OFDM (Cyclic Prefix-Orthogonal Frequency Division Multiplexing) or other multi-carrier transmission method in the uplink and the downlink. The communications system may also use FBMC (Filter Bank Multi Carrier) applied with a filter, f-OFDM (Filtered-OFDM), UF-OFDM (Universal Filtered-OFDM), W-OFDM (Windowing-OFDM), transmission methods using sparse code (SCMA: Sparse Code Multiple Access), or the like. Furthermore, the communications system may apply DFT precoding and use the signal waveform that used the above-mentioned filter. Furthermore, the communications system may perform code spreading, interleaving, sparse code in the above-mentioned transmission method. Additionally, the following paragraphs describe the situation that at least one of DFTS-OFDM transmission and CP-OFDM transmission is used for the uplink and CP-OFDM transmission is used for the downlink. The present disclosure is not limited to this, other transmission method may also be applied.

The base station device and the terminal device according to the present disclosure may perform communications on the bands using a licensed band, for which grant (license) is obtained from a country or region where the radio service provider, and/or an unlicensed band that does not require grant (license) from a country or region. In the unlicensed band, communications based on carrier sense (for example, listen before talk method) may be performed.

In the present implementation, "X/Y" includes the meaning of "X or Y." In the present implementation, "X/Y" includes the meanings of "X and Y." In the present implementation, "X/Y" includes the meaning of "X and/or Y."

First Implementation

FIG. 1 is a schematic diagram of a communication system according to a present implementation. The communications system according to the present implementation includes a base station device 10, terminal devices 20-1 to 20-$n1$ ($n1$ is the number of terminal devices connected to the base station device 10). The terminal devices 20-1 to 20-$n1$ may also be collectively referred to as a terminal device 20. The coverage 10*a* is an area (communications area) (also referred to as a cell) that the base station device 10 can connect to the terminal device 20.

In FIG. 1, the wireless communication of the uplink r30 includes at least the following uplink physical channels. The uplink physical channel is used for transmitting information output from a higher layer.

Physical uplink control channel (PUCCH)
Physical uplink shared channel (PUSCH)
Physical random access channel (PRACH)

The PUCCH is a physical channel used to transmit uplink control information (Uplink Control Information: UCI). The uplink control information includes a positive acknowledgement (ACK)/a negative acknowledgement (NACK) of downlink data (Downlink Transport Block, Medium Access Control Protocol Data Unit: MAC PDU, Downlink-Shared Channel: DL-SCH, Physical Downlink Shared Channel: PDSCH). The ACK/NACK may also be referred to as HARQ-ACK (Hybrid Automatic Repeat Request ACKnowledgement), HARQ feedback, HARQ response, or HARQ control information, and a signal indicating transmission confirmation.

The uplink control information includes a scheduling request (SR), the SR is used to request a PUSCH (Uplink-Shared Channel: UL-SCH) resource for the initial transmission. The scheduling request includes a positive scheduling request or a negative scheduling request. A positive scheduling request indicates requesting UL-SCH resources for the initial transmission. A negative scheduling request indicates not requesting UL-SCH resources for the initial transmission.

The uplink control information includes downlink channel state information (CSI). The downlink channel state information includes: a rank indicator (RI) indicating a preferable number of spatial multiplexing (number of layers), a precoding matrix indicator (PMI) indicating a preferable precoder, a channel quality indicator (CQI) indicating a preferable transmission rate. The PMI indicates a codebook determined by the terminal device. The codebook is related to the precoding of a physical downlink shared channel. The CQI may be used to indicate a preferable modulation scheme (for example, QPSK, 16 QAM, 64 QAM, 256 QAM, etc.), a coding rate, and an index (CQI index) indicating frequency usage efficiency in a predetermined band. The terminal device selects a CQI index from the CQI table, so that the PDSCH transport block can be received without exceeding a predetermined block error rate (for example, an error rate of 0.1). Here, the terminal device may have a plurality of predetermined error rates specified for the transport block. For example, the error rate of eMBB data may have a target of 0.1, and the error rate of URLLC may have a target of 0.00001. The terminal device may perform CSI feedback for each target error rate (transport block error rate) when being set by a higher layer (for example, as set by RRC signaling from a base station), or perform CSI feedback for the target error rate as set by a higher layer when the target error rate of a plurality of target error rates is set in a higher layer. Furthermore, according to whether the error rate is set by selecting the CQI table that is not a CQI table for the eMBB (that is, transmission of the BLER does not exceed 0.1) and is not set according to whether it is set via RRC signaling, the CSI may be calculated via an error rate that is not an error rate used for eMBB (for example, 0.1).

The PUCCH defines PUCCH format 0 to 4. PUCCH format 0 and 2 are transmitted with 1 to 2 OFDM symbols; and PUCCH format 1, 3, and 4 are transmitted with 4 to 14 OFDM symbols. PUCCH format 0 and PUCCH format 1 are used for notification that is 2 bits or less, and can notify only the HARQ-ACK, only the SR, or HARQ-ACK and SR simultaneously. PUCCH formats 1, 3, and 4 are used for notification that is more than 2 bits, and can notify the HARQ-ACK, the SR, and the CSI simultaneously. The number of OFDM symbols used for the PUCCH transmission is set by a higher layer (for example, set via RRC signaling). The PUCCH format being used is determined according to whether to transmit the SR or transmit the CSI with the timing (slot, OFDM symbol) for transmitting PUCCH.

In the configuration information of PUCCH, that is PUCCH-config, there is included information relating to whether PUCCH formats 1 to 4 is used, PUCCH resources (initial physical resource block, PRB-Id), PUCCH format that can be used in each PUCCH resource, setting of frequency hopping within slot, and also the setting information of the SR, that is, SchedulingRequestResourceConfig. The setting information of the SR includes a scheduling request ID, a periodicity and an offset of the scheduling request, and PUCCH resource information being used. Furthermore, the scheduling request ID is used to associate the SR prohibit timer set in the SchedulingRequestConfig in the MAC-CellGroupConfig and the maximum number of transmissions of the SR and the setting thereof.

The PUSCH is a physical channel used to transmit uplink data (Uplink Transport Block, Uplink-Shared Channel: UL-SCH). The PUSCH may also be used to transmit the HARQ-ACK and/or channel state information for downlink data together with the uplink data. The PUSCH may also be used to transmit the channel state information only. The PUSCH may be used to transmit the HARQ-ACK and channel state information only.

The PUSCH is used for transmitting radio resource control (RRC) signaling. The RRC signaling is also referred to as RRC message/RRC layer information/RRC layer signal/RRC layer parameter/RRC information/RRC information element. The RRC signaling is information/signals processed in the radio resource control layer. The RRC signaling transmitted from the base station device may also be common signaling specific to the plurality of terminal devices in a cell. The RRC signaling transmitted from the base station device may be dedicated signaling (also referred to as dedicated signaling) for a certain terminal device. That is, user equipment-specific (UE-specific) information is transmitted to a certain terminal device using dedicated signaling. The RRC message can include the UE capability of the terminal device. The UE capability is information indicating a function supported by the terminal device.

The PUSCH may also be used to transmit a MAC CE (Medium Access Control Element). The MAC CE is information/signals processed (transmitted) in a medium access control layer. For example, the power headroom (PH) may be included in the MAC CE and reported via the physical uplink shared channel. That is, the MAC CE field is used to indicate the power headroom level. The uplink data may include an RRC message, MAC CE. The RRC signaling and/or MAC CE are also referred to as higher layer signals. The RRC signaling and/or MAC CE are included in the transport block.

The PUSCH may also be used for data transmission of dynamic scheduling (aperiodic radio resource allocation) performed for designated radio resource uplink data transmission based on uplink transmission parameters (for example, resource allocation in the time domain, resource allocation in the frequency domain, etc.) included in the DCI format. The PUSCH receives frequency hopping performed by GrantConfig included in the RRC message, DMRS configuration, MCS table, MCS table-transformed precoder, uci-onPUSCH, resource allocation type, RBG size, closed-loop transmission power control (powerControlLoopToUse), target receiving power and a set (p0-PUSCH-Alpha), TransformPrecoder (precoder), nrofHARQ (number of HARQ processes), number of retransmissions of the same data (repK), repK-RV (redundancy version mode for retransmission of the same data), periodicity of Configured Grant Type 1 and Type 2, and a timer for receiving NACK of Configured Grant; subsequently, receives DCI format 0_0/0_1/1_0/1_1 of CRC scrambled by CS-RNTI, and further receives activation control information of validation as set in a predetermined field of the received DCI format 0_0/0_1/1_0, and thereby, the data transmission of DL SPS (Semi-Persistent Scheduling) or Configurable Grant Type 2 that permits periodic radio resource data transmission may be used. Here, the field used for validation may also use all bits of the HARQ process numbering and the 2 bits of RV. Furthermore, the validation field of control information used for deactivating (releasing) Configured Grant Type 2 transmission may also use all bits of the HARQ process numbering, all bits of the MCS, all bits of the resource block assignment, the 2 bits of the RV, and the like. Furthermore, the PUSCH, through RRC, in addition to information of Configured Grant Type 2, further receives rrcConfiguredUplinkGrant, which can also be used in Configured Grant Type 1 transmission that the periodic data transmission is permitted. In the information of rrcConfiguredUplinkGrant, it may also include time domain resource allocation, time domain offset, frequency domain resource allocation, antenna port, DMRS sequence initialization, precoding and layer numbers, SRS resource indicator, MCS and TBS, frequency hopping offset, path loss reference index. Also, in the same serving cell (within the component carrier), when configured with Configured Grant Type 1 transmission and Configured Grant Type 2 transmission, the Configured Grant Type 1 transmission may be prioritized. Furthermore, in the same serving cell, when the uplink grant of Configured Grant Type 1 transmission and the uplink grant of dynamic scheduling overlap in the time domain, the uplink grant of dynamic scheduling may override (only dynamic scheduling is used to override the uplink grant of Configured Grant Type 1 transmission). Furthermore, a plurality of uplink grants overlapping in the time domain may mean that they overlap in at least a part of the OFDM symbols, and when the subcarrier intervals (SCS) are different, since the OFDM symbol lengths are different, it may also mean a part of the time in the OFDM symbols overlaps. The setting of Configured Grant Type 1 transmission may also set SCells that are activated not by RRC. The Scell of Configured Grant Type 1 transmission, after being activated, the uplink grant of Configured Grant Type 1 transmission may also become valid.

The PRACH is used to transmit a preamble, which is used for random access. The PRACH is used for indicating an initial connection establishment procedure, a handover procedure, a connection re-establishment procedure, synchronization (timing adjustment) for uplink transmission, and a request for a PUSCH (UL-SCH) resource.

In the uplink wireless communications, an uplink reference signal (UL RS) is used as an uplink physical signal. The uplink reference signal includes a demodulation reference signal (DMRS) and a sounding reference signal (SRS). DMRS is related to the transmission of the physical uplink shared channel/physical uplink control channel. For example, when the base station device 10 performs demodulating on a physical uplink shared channel/physical uplink control channel, the base station device 10 uses a demodulation reference signal to perform channel estimation/channel correction. For the uplink DMRS, the maximum number of OFDM symbols of front-loaded DMRS and additional setting of the DMRS symbol (DMRS-add-pos) is specified via RRC by the base station device. When the front-loaded DMRS is 1 OFDM symbol (single symbol DMRS), DCI specifies, in the OFDM symbol of the DMRS that includes frequency allocation and the value of the cyclic shift in the frequency domain, how the different frequency domain allocation degrees is to be used. When the front-loaded DMRS is 2 OFDM symbols (double symbol DMRS), in addition to the above, DCI specifies the setting of the time spreading is to be a length 2.

SRS (Sounding Reference Signal) is not related to the transmission of the physical uplink shared channel/physical uplink control channel. That is, the terminal device transmits the SRS periodically or non-periodically regardless of the uplink data transmission. In the periodic SRS, a terminal device transmits an SRS based on a parameter notified by a higher layer signal (for example, RRC) from a base station device. On the other hand, in the aperiodic SRS, the terminal device transmits an SRS based on a parameter notified by a higher layer signal (for example, RRC) from the base station device and a physical downlink control channel (for example, DCI) indicating the transmission timing of the SRS. The base station device 10 uses the SRS to measure the uplink channel state (CSI Measurement). The base station device 10 may perform timing alignment and closed-loop transmission power control according to the measurement result obtained from receiving the SRS.

In FIG. 1, at least the following downlink physical channels are used in the wireless communication of the downlink r31. The downlink physical channel is used for transmitting information output from a higher layer.

Physical broadcast channel (PBCH)
Physical downlink control channel (PDCCH)
Physical downlink shared channel (PDSCH)

The PBCH is used to broadcast a master information block (MIB, Broadcast Channel: BCH) commonly used in the terminal device. The MIB is one of system information. For example, the MIB includes downlink transmission bandwidth setting and a system frame number (SFN). The MIB may include at least a part of information of transmitting PBCH indicating a slot number, a subframe number, and a radio frame number.

The PDCCH is used to transmit downlink control information (DCI). The downlink control information defines a plurality of formats (also referred to as DCI formats) based on the applications. The DCI format may also be defined based on the type of DCI and the number of bits used to constituting a DCI format. The downlink control information includes control information for transmitting downlink data and control information for transmitting uplink data. The DCI format for downlink data transmission may also be referred to as downlink assignment (or downlink grant, DL Grant). The DCI format for transmitting uplink data may also be referred to as uplink grant (or uplink assignment, UL Grant).

The DCI formats for downlink data transmission include DCI format 1_0 and DCI format 1_1. The DCI format 1_0 is used for the fall back of downlink data transmission, and has fewer configurable parameters (fields) than the DCI format 1_1 supporting MIMO (Multiple Input Multiple Output) or the like. Furthermore, the DCI format 1_1 may change the presence/absence (valid/invalid) of the notified parameter (field), according to the field that is set to be valid, the number of bits is greater than that of the DCI format 1_0. On the other hand, the DCI format 1_1 may notify of MIMO or a plurality of codewords transmission, ZP CSI-RS triggering, CBG (Code Block Group) transmission information, and the like. Furthermore, the DCI format 1_1 may add the presence/absence of a field or number of bits according to the setting of higher layer (for example, RRC signaling, MAC CE). One downlink assignment is used for scheduling one PDSCH in one serving cell. When BWP is configured, it is used for scheduling one PDSCH in a valid BWP in one serving cell. The downlink grant may be used at least for scheduling the PDSCH in the same slot/subframe as the slot/subframe that the downlink grant transmits in. The downlink grant may be used for scheduling PDSCH from the slot/sub-frame that the downlink grant transmits in to after the $K_0$ slot/subframe. Furthermore, the downlink grant may also be used for scheduling the PDSCH of a plurality of slots/subframes. The downlink assignment performed with the DCI format 1_0, the following fields may be included. For example, there may be DCI format identifier, frequency domain resource assignment (resource block allocation and resource allocation for PDSCH), time domain resource assignment, mapping from VRB (Virtual Resource Block) to PRB, MCS (Modulation and Coding Scheme) for PDSCH, information indicating the modulation order and coding rate, NDI (NEW Data Indicator) for instructing initial transmission or retransmission, information indicating the HARQ process number of the downlink, redundancy version (RV) information of redundant bits added to the codeword when error correction coding, DAI (Downlink Assignment Index), PUCCH transmission power control (TPC: Transmission Power) Control) instructions, PUCCH resource indicators, and the indicators of HARQ feedback timing from PDSCH, etc. Furthermore, the DCI format for each downlink data transmission includes information (field) required for the application of the above-mentioned information. Either one or both of the DCI format 1_0 and the DCI format 1_1 may be used for activating and deactivating (releasing) of the downlink SPS. The DCI format 1_1 may, when a plurality of BWPs are configured, instruct switching of a valid (Active) BWP. In this example, one BWP is set to be valid in one serving cell.

The DCI formats for uplink data transmission include DCI format 0_0 and DCI format 0_1. The DCI format 0_0 is used for the fall back of uplink data transmission, and has fewer configurable parameters (fields) than the DCI format 0_1 supporting MIMO or the like. Furthermore, the DCI format 0_1 may change the presence/absence (valid/invalid) of the notified parameter (field), according to the field that is set to be valid, the number of bits is greater than that of the DCI format 0_0. On the other hand, DCI format 0_1 may notify of MIMO or multiple codeword transmission, SRS resource indicator, precoding information, antenna port information, SRS request information, CSI request information, CBG transmission information, uplink PTRS (Phase Tracking Reference Signal) association, DMRS sequence initialization. Furthermore, the DCI format 0_1 may add the presence/absence of a field or number of bits according to the setting of higher layer (for example, RRC signaling). One uplink grant is used to notify the terminal device of the scheduling of one PUSCH in one serving cell. When BWP is configured, it is used for scheduling one PUSCH in a valid BWP in one serving cell. The uplink grant may be used for scheduling PUSCH from the slot/sub-frame that the uplink grant transmits in to after the $K_2$ slot/subframe. Furthermore, the uplink grant may also be used for scheduling the PUSCH of a plurality of slots/subframes. The uplink assignment performed with the DCI format 0_0, the following fields may be included. For example, there may be DCI format identifier, frequency domain resource assignment (information related to resource block allocation for transmitting PUSCH), time domain resource assignment, frequency hopping flag, information related to MSC of PUSCH, RV, NDI, information indicating the HARQ process number of the uplink, TPC instructions for PUSCH, UL/SUL (Supplemental UL) indicator, etc. Either one or both of DCI format 0_0 and DCI format 0_1 may be used for activating and deactivating (releasing) of the uplink SPS. The DCI format 1_0 may, when a plurality of BWPs are configured, instruct switching of a valid (Active) BWP. In this example, one BWP is set to be valid in one serving cell.

The DCI format may be used for notifying a slot format indicator (SFI) in DCI format 2_0 in which CRC is scrambled with SFI-RNTI. The DCI format may also use DCI format 2_1, in which the CRC is scrambled with INT-RNTI, for notifying of PRB (one or more) and OFDM symbol (one or more) for which the terminal device intends to perform downlink data transmission not for its own. The DCI format may use DCI format 2_2, in which a CRC is scrambled with TPC-PUSCH-RNTI or TPC-PUCCH-RNTI, for transmitting a TPC instruction for PUSCH and PUCCH. The DCI format may also use DCI format 2_3, in which a CRC is scrambled with TPC-SRS-RNTI, for transmitting a TPC instruction group transmitted by SRS for one or more terminal devices. The DCI format 2_3 may also be used for SRS requests. The DCI format may also use DCI format 2_X (for example, DCI format 2_4, DCI format 2_1A), in which a CRC is scrambled with INT-RNTI or other RNTI (for example, UL-INT-RNTI), for notifying of PRB (one or more) and the OFDM symbol (one or more) that has used UL Grant/Configured UL Grant scheduling and is not provided to the terminal device for data transmission.

The MCS for the PDSCH/PUSCH can use an index (MCS index) to indicate the modulation order and the target coding rate of the PDSCH/PUSCH. The modulation order corresponds to a modulation scheme. The modulation orders "2," "4" and "6" indicate "QPSK," "16QAM" and "64QAM," respectively. Furthermore, when the 256QAM or 1024QAM is set in a higher layer (for example, RRC signaling), the modulation order "8" and "10" may be notified to indicate "256 QAM" and "1024 QAM," respectively. The target coding rate is used to determine a TBS (transport block size), which is the number of bits transmitted, according to the number of PDSCH/PUSCH resource elements (number of resource blocks) scheduled on the PDCCH. The communication system 1 (the base station device 10 and the terminal device 20) shares the transport block size calculation method according to the MCS, the target coding rate, and the number of resource elements (the number of resource blocks) allocated for transmission on PDSCH/PUSCH.

The PDCCH is generated by appending a cyclic redundancy check (CRC) to the downlink control information. In the PDCCH, the CRC parity bits are scrambled (also referred to as an exclusive OR operation, or masking) using a predetermined identifier. The parity bits are scrambled with C-RNTI (Cell-Radio Network Temporary Identifier), CS (Configured Scheduling)-RNTI, TC (Temporary C)-RNTI, P (Paging)-RNTI, SI (System Information)-RNTI, RA (Random Access)-RNTI, INT-RNTI, SFI (Slot Format Indicator)-RNTI, TPC-PUSCH-RNTI, TPC-PUCCH-RNTI, or TPC-SRS-RNTI. C-RNTI is an identifier used for identifying dynamic scheduling, and CS-RNTI is an identifier used for identifying a terminal device in a cell according to SPS/Grant-Free Access/Configured Grant Type 1 or Type 2. Temporary C-RNTI is an identifier for identifying a terminal device that has transmitted a random access preamble in a contention-based random access procedure. C-RNTI and Temporary C-RNTI are used to control PDSCH transmission or PUSCH transmission in a single subframe. CS-RNTI is used for periodically allocating PDSCH or PUSCH resources. P-RNTI is used to transmit a paging message (Paging Channel: PCH). SI-RNTI is used for transmitting SIB. RA-RNTI is used for transmitting a random access response (Message 2 in a random access procedure). SFI-RNTI is used to notify of a slot format. INT-RNTI is used to notify of a downlink/uplink pre-emption. TPC-PUSCH-RNTI, TPC-PUCCH-RNTI, and TPC-SRS-RNTI are used to notify the transmission power control values of PUSCH, PUCCH, and SRS, respectively. Furthermore, the identifier may include the CS-RNTI for each setting in order to configure a plurality of Grant-Free Access/SPS/Configured Grant Type 1 or Type 2. The DCI appended with the CRC scrambled by the CS-RNTI may be used for the grant-free access activation, deactivation (release), parameter change or retransmission control (ACK/NACK transmission). The parameter may include resource configuration (DMRS configuration parameters, frequency domain/time domain resources for the grant-free access, MCS used for the grant-free access, number of repetitions, presence/absence of frequency hopping, etc.).

The PDSCH is used to transmit downlink data (downlink transport block, DL-SCH). The PDSCH is used to transmit a system information message (also referred to as System Information Block: SIB). A part or all of the SIB may be included in the RRC message.

The PDSCH is used to transmit RRC signaling. The RRC signaling transmitted from the base station device may be common to a plurality of terminal devices in a cell (cell-specific). That is, the information common to the user equipment in the cell is transmitted using cell-specific RRC signaling. The RRC signaling transmitted from the base station device may also be a message dedicated to a certain terminal device (also referred to as dedicated signaling). That is, the information specific to the user equipment (UE-Specific) is transmitted using a dedicated signaling of a certain terminal device.

The PDSCH is used to transmit a MAC CE. The RRC signaling and/or MAC CE may also be referred to as higher layer signaling. The PMCH is used to transmit multicast data (Multicast Channel: MCH).

In the downlink wireless communications of FIG. 1, a synchronization signal (SS) and a downlink reference signal (DL RS) are used as downlink physical signals.

The synchronization signal is used by the terminal device to obtain synchronization of the downlink frequency domain and the downlink time domain. The downlink reference signal is used by the terminal device to perform channel estimation/channel correction of a downlink physical channel. For example, the downlink reference signal is used for demodulating PBCH, PDSCH, and PDCCH. The downlink reference signal may also be used by the terminal device to measure the downlink channel state (CSI measurement). The downlink reference signal includes CRS (Cell-specific Reference Signal), CSI-RS (Channel State Information Reference Signal), DRS (Discovery Reference Signal) and DMRS (Demodulation Reference Signal).

A downlink physical channel and a downlink physical signal may collectively be referred to as a downlink signal. Furthermore, the uplink physical channel and the uplink physical signal may collectively be referred to as an uplink signal. Furthermore, the downlink physical channel and the uplink physical channel may collectively be referred to as a physical channel. Furthermore, the downlink physical signal and the uplink physical signal may collectively be referred to as a physical signal.

BCH, UL-SCH and DL-SCH are transmission channels. The channels used in the MAC layer are referred to as transmission channels. The unit of the transmission channel used in the MAC layer is also referred to as a transport block (TB) or a MAC PDU (Protocol Data Unit). The transport block is a unit of data that the MAC layer delivers to the physical layer. In the physical layer, transport blocks are mapped to codewords, and coding process is performed for each codeword.

The higher layer processing performs processing of the higher layer through physical layer such as a medium access control (MAC) layer, a packet data integration protocol (PDCP) layer, a radio link control (RLC) layer, and a radio resource control (RRC) layer.

Processing of the higher layer is performed through physical layer such as a medium access control (MAC) layer, a packet data integration protocol (PDCP) layer, a radio link control (RLC) layer, and a radio resource control (RRC) layer.

The higher layer processing unit are configured with various RNTIs for each terminal device. The RNTI is used for encrypting (scrambling) of PDCCH, PDSCH, and the like. In the process of the higher layer, downlink data (transport block, DL-SCH) configured on the PDSCH, system information specific to the terminal device (System Information Block: SIB), RRC message, MAC CE, or the like are generated or obtained from a higher node, and transmitted. In the processing of the higher layer, various configuration information of the terminal device 20 is managed. Furthermore, a part of the function of the radio resource control may be performed in the MAC layer or the physical layer.

In the processing of the higher layer, information related to the terminal device, such as functions supported by the terminal device (UE capability), is received from the terminal device 20. The terminal device 20 transmits its functions to the base station device 10 with higher layer signaling (RRC signaling). The information related to the terminal device includes information indicating whether the terminal device supports specified functions, or information indicating that the terminal device has completed the installation and testing of the specified functions, wherein whether the specified functions are supported includes whether the installation and testing of the specified function has been completed.

When a terminal device supports a specified function, the terminal device transmits information (parameter) indicating whether the terminal device supports the specified function. When the terminal device does not support the specified function, the terminal device may not have to transmit information (parameter) indicating whether the terminal device supports the specified function. That is, whether to support the specified function is notified according to whether to transmit the information (parameter) indicating whether the specified function is supported. Furthermore, the information (parameter) indicating whether the specified function is supported may be notified using one bit of 1 or 0.

In FIG. 1, a base station device 10 and a terminal device 20, in the uplink, MA (Multiple Access) using the grant-free access (may also be referred to as grant-less access, contention-based access, autonomous access, or resource allocation for uplink transmission without grant, configured grant type 1 transmission etc., hereinafter referred to as grant-free access) is supported. The grant-free access includes the following method, that is, not performing the procedure of designating a physical resource and transmission timing for the terminal device to transmit SR and for the base station device to transmit data according to the UL grant that uses DCI (may also be referred to as the UL grant using L1 signaling), instead, the terminal device transmits uplink transmission data (such as a physical uplink channel). Therefore, the terminal device may, based on RRC signaling (Configured GrantConfig), allocate available resources, the target receiving power, the value ($\alpha$) of the fraction TPC, the number of HARQ processes, the RV pattern at the times of retransmission of the same transmission. In addition, the terminal device may receive, in advance, physical resources (frequency domain resource allocations, time domain resource allocations) used for the grant-free access as configured uplink grant (rrcConfiguredUplinkGrant, configured uplink grant) of RRC signaling or transmission parameters (may include DMRS cyclic offset or OCC, antenna port number, position and number of OFDM symbols of configured DMRS, the times of retransmission of the same transmission), and use the configured physical resources for data transmission when the transmission data is in the buffer. That is, when the higher layer does not transmit the transport block for transmission by the grant-free access, data transmission of the grant-free access is not performed. Furthermore, even though the terminal device receives the ConfiguredGrantConfig, when the rrc-ConfiguredUplinkGrant of the RRC signaling is not received, the terminal device may perform activation using UL Grant (DCI format), and transmit data using UL SPS (configured grant type 2 transmission).

There are the following two types of the grant-free access. The first configured grant type 1 transmission (UL-TWG-type1) is the following method. That is, the base station device transmits transmission parameter related to the grant-free access to the terminal device through a higher layer signal (for example, RRC). Furthermore, the grant start (activation, RRC configuration) and the grant end (deactivation (release), RRC release) of the grant-free access data transmission, and the changes in transmission parameter are also transmitted by a higher layer signal. Here, the transmission parameters related to the grant-free access may also include the physical resources (time-domain and frequency-domain resource assignments) that may be used for the grant-free access data transmission, physical resource periodicity, MCS, presence/absence of retransmission, the number of retransmissions, the RV configuration during retransmission, presence/absence of frequency hopping, hopping pattern, DMRS configuration (number of OFDM symbols of front-loaded DMRS, setting of cyclic shift and time spreading, etc.), number of HARQ processes, information related to transform precoder, and information related to TPC configuration. The transmission parameters and the grant start/end of the grant-free access data transmission may be set at the same time, or, after the transmission parameter for the grant-free access is set, the grant start/end of the grant-free access data transmission may be set with different timing (for Scell, it may be the SCell activation). For the second configured grant type2 transmission (UL-TWG-type2, UL SPS), the base station device transmits transmission parameter related to the grant-free access to the terminal device through a higher layer signal (for example, RRC). The grant start (activation, RRC configuration) and the grant end (deactivation (release), RRC release) of the grant-free access data transmission, and the changes in transmission parameter are also transmitted by DCI (L1 signaling). Here, the RRC includes the physical resource periodicity, number of repetitions, the RV configuration during retransmission, number of HARQ processes, information related to transform precoder, and information related to TPC configuration. The transmission parameters and the grant start/end of the grant-free access data transmission may be set at the same time, or, after the transmission parameter for the grant-free access is set, the grant start/end of the grant-free access data transmission may be set with different timing. This implementation may also be applied to any grant-free access disclosed herein.

On the other hand, the SPS (Semi-Persistent Scheduling) technology has been introduced in LTE, and can be applied to VoIP (Voice over Internet Protocol) service that requires periodic resource allocation. In the SPS, the DCI is used to specify the start timing of periodic physical resources (periodic allocation of resource blocks), or to perform the start (activation) of grant of UL Grant including transmission parameters such as MCS. Therefore, the starting procedure of the type (UL-TWG-type1) of grant start (activation) that uses a higher layer signal (for example, RRC) of the grant-free access is different to the starting procedure of SPS. Furthermore, although UL-TWG-type2 is the same in the aspect of using DCI (L1 signaling) to perform grant start (activation), it may be different in the aspects of being able to use Scell or BWP, SUL, or in the aspects of using RRC signaling to notify the number of repetition, the RV configuration during retransmission. Furthermore, the base station device may, according to the DCI (L1 signaling) used in the grant-free access (configured UL grant type 1 and configured UL grant type 2) and the DCI used in dynamic scheduling, scramble using different types of RNTI. The base station device may also, according to the DCI used for the retransmission control of UL-TWG-type 1 and the DCI used for the retransmission control and the activation and deactivation (release) of UL-TWG-type 2, scramble using the same RNTI (CS-RNTI).

The base station device 10 and the terminal device 20 supports orthogonal multiple access as well as non-orthogonal multiple access. Furthermore, the base station device 10 and the terminal device 20 may support both the grant-free access and scheduled access (dynamic scheduling). Here, the uplink scheduled access indicates that the terminal device 20 transmits data according to the following sequence. The terminal device 20 requests the base station device 10 for radio resources for transmitting uplink data using a random access procedure (Random Access Procedure) or SR. The base station device provides UL Grant to each terminal device through DCI based on RACH or SR. After receiving the UL Grant control information from the base station device, the terminal device transmits uplink data using the specified radio resources based on the uplink transmission parameters included in the UL Grant.

The downlink control information for uplink physical channel transmission may include a shared field of scheduled access and the grant-free access. In this situation, when the base station device 10 instructs to transmit an uplink physical channel by the grant-free access, the base station device 10 and the terminal device 20 interpret the bit sequence stored in the shared field according to the configuration of the grant-free access (For example, a reference table defined for the grant-free access). Similarly, when the base station device 10 instructs to transmit an uplink physical channel by scheduled access, the base station device 10 and the terminal device 20 interpret the shared field according to the configuration of the scheduled access. The transmission of an uplink physical channel by the grant-free access is also referred to as asynchronous data transmission. Furthermore, the transmission of a scheduled uplink physical channel is referred to as synchronous data transmission.

In the grant-free access, the terminal device 20 may randomly select a radio resource for transmitting uplink data. For example, a plurality of available radio resource candidates form a resource pool and is notified from the base station device 10, the terminal device 20 randomly selects a radio resource from the resource pool. In the grant-free access, the radio resources of transmitting the uplink data for the terminal device 20 may be preset by the base station device 10. In this situation, the terminal device 20 transmits the uplink data using the preset radio resource without receiving the UL Grant of DCI (including the designation of the physical resource). The radio resource may be composed of a plurality uplink multiple access resources (resources to which uplink data may be mapped). The terminal device 20 transmits uplink data using one or more uplink multiple access resources selected from the plurality of uplink multiple access resources. Furthermore, the radio resources for transmitting uplink data of the terminal device 20 may be determined in advance in the communications system of the base station device 10 and the terminal device 20. The radio resources for transmitting uplink data may be notified by the base station device 10 to the terminal device 20 via a physical broadcast channel (for example, PBCH: Physical Broadcast Channel)/Radio Resource Control (RRC)/system information (for example, SIB: System Information Block)/physical downlink control channel (downlink control information, for example, PDCCH: Physical Downlink Control Channel, EPDCCH: Enhanced PDCCH, MPDCCH: MTC PDCCH, NPDCH: Narrowband PDCCH.

In the grant-free access, the uplink multiple access resource is composed of a multiple access physical resource and a multiple access signature resource. The multiple access physical resource is a resource composed of time and frequency. The multiple access physical resource and the multiple access signature resource may be used to determine an uplink physical channel transmitted by each terminal device. The resource block is a unit of physical channel (for example, a physical data shared channel, a physical control channel) to which the base station device 10 and terminal device 20 may be map. In the frequency domain, the resource block is composed of one or more subcarriers (for example, 12 subcarriers or 16 subcarriers).

The multiple access signature resource is composed of at least one multiple access signature of a plurality of multiple access signature groups (also referred to as a multiple access signature pool). The multiple access signature is information indicating characteristic (marks, indicators) for distinguishing (identifying) uplink physical channels transmitted by each terminal device. The multiple access signature includes at least one of: a spatial multiplexing pattern, a spreading code pattern (Walsh code, OCC: Orthogonal Cover Code, cyclic shift for data spreading, sparse code, etc.), an interleaving pattern, a reference signal pattern for demodulation (reference signal sequence, cyclic shift, OCC, IFDM)/an identification signal pattern, transmission power, etc. In the grant-free access, the terminal device 20 transmits uplink data using one or more multiple access signatures selected from the multiple access signature pool. The terminal device 20 may notify the base station device 10 of an available multiple access signature. The base station device 10 may notify the terminal device of the multiple access signature used when the terminal device 20 transmits uplink data. The base station device 10 may notify the terminal device 20 of the multiple access signature group that is available for use when the terminal device 20 transmits uplink data. The available multiple access signature group may also be notified using a broadcast channel/RRC/system information/ downlink control channel. In this situation, the terminal device 20 may transmit the uplink data using the multiple access signature selected from the notified multiple access signature group.

The terminal device 20 transmits uplink data using the multiple access resource. For example, the terminal device 20 may map uplink data to a multiple access resource that is composed of one multiple access physical resource and a multiple carrier signature resource including spreading code pattern or the like. The terminal device 20 may also assign uplink data to a multiple access resource composed of one multiple access physical resource and a multiple carrier signature resource including interleaving patterns. The terminal device 20 may also map uplink data to a multiple access resource composed of one multiple access physical resource and a multiple access signature resource including demodulation reference signal pattern/identification signal pattern. The terminal device 20 may also map uplink data to a multiple access resource composed of one multiple access physical resource and a multiple access signature resource including transmission power pattern (for example, the transmission power of each uplink data may be set by the method of generating the receiving power differential in the base station device 10). In such grant-free access, in the communications system according to the present implementation, it is possible to transmit the uplink data transmitted by the plurality of terminal devices 20 in the physical resource of uplink multiple access in an overlapped (superimposed, spatial multiplexed, non-orthogonal multiplexed, contention-based) manner.

The base station device 10 detects an uplink data signal transmitted by each terminal device in the grant-free access. For detecting the uplink data signal, the base station device 10 may also include SLIC (Symbol Level Interference Cancellation) that removes interference based on the demodulation result of the interference signal, and CWIC (Codeword Level Interference Cancellation, also referred to as successive interference canceller (SIC) or parallel interference canceller (PIC)) that removes interference based on the decoding result of the interference signal), turbo equalization, maximum likelihood detection (MLD, R-MLD: reduced complexity maximum likelihood detection) of the most likely transmission signal searched from candidate transmission signal, EMMSE-IRC (Enhanced Minimum Mean Square Error-Interference Rejection Combining) that suppress interference signal by linear operation, signal detection performed by message passing (BP: Belief Propagation) or matched filter (MF)-BP that is has the matched filter and BP combined, and the like.

Figure 2:
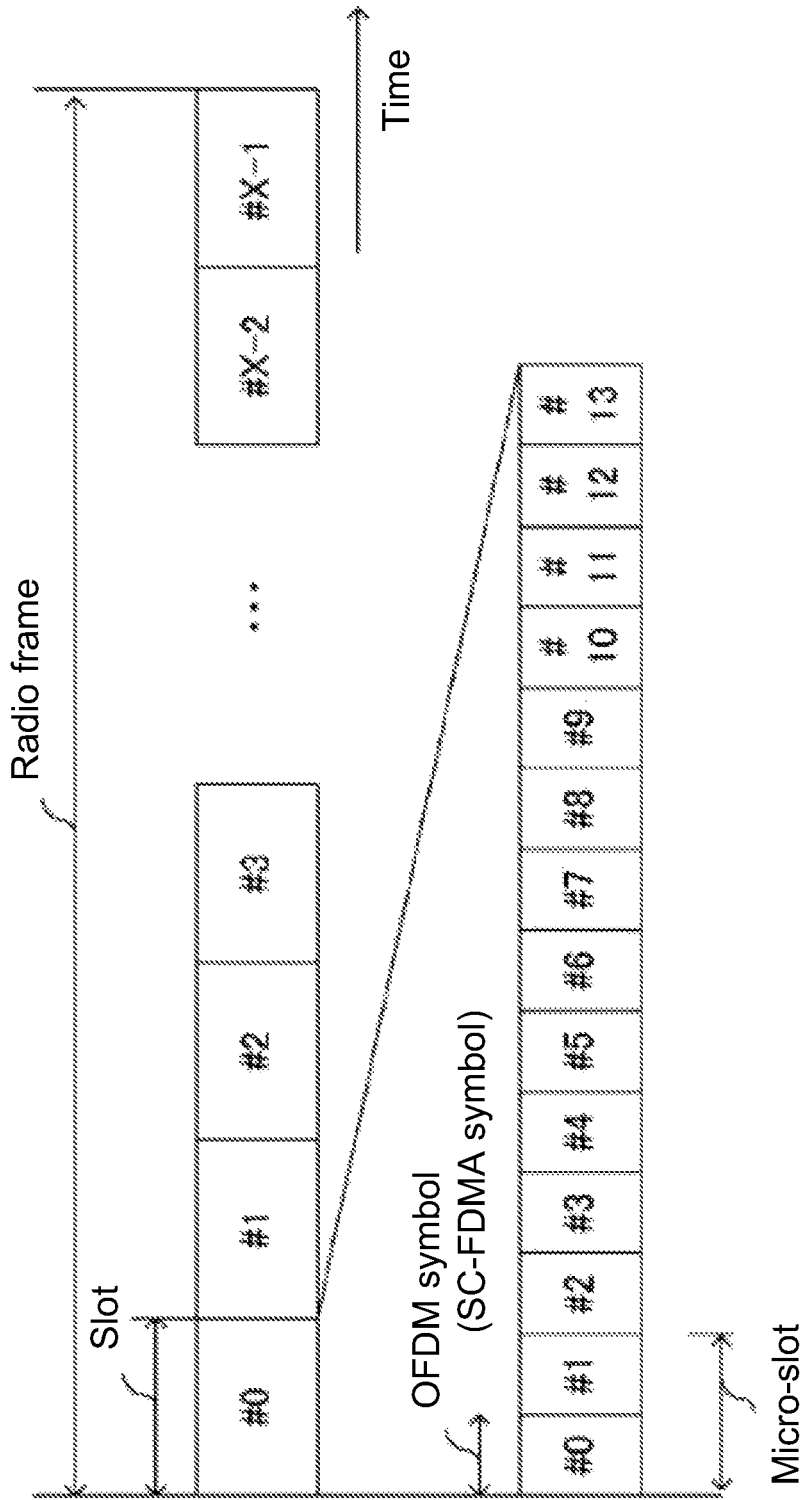
FIG. 2 is a schematic diagram of an example of a radio frame configuration of a communication system according to a first implementation of the present disclosure.

FIG. 2 is a schematic diagram of an example of a radio frame configuration of a communication system according to the present disclosure. The radio frame configuration indicates a configuration in a time domain multiple access physical resource. One radio frame is composed of a plurality of slots (may also be subframes). FIG. 2 is an example of a radio frame which is composed of 10 slots. The terminal device 20 includes a subcarrier interval (reference parameter set) as a reference. The subframe is composed of a plurality of OFDM symbols generated in subcarrier intervals as a reference. FIG. 2 is an example of that, the subcarrier interval is 15 kHz, one frame is composed of 10 slots, one subframe is composed of 1 slot, and one slot is composed of 14 OFDM symbols. When the subcarrier interval is 15 kHz×2µ, (µ is an integer of 0 or more), one frame is composed of 2µ×10 slots, and one subframe is composed of 2p, slots.

FIG. 2 illustrates the situation when the subcarrier interval as a reference is the same as the subcarrier interval used for uplink data transmission. The communications system of the present implementation may set a slot to be a minimum unit for the terminal device 20 mapping physical channel (for example, physical data shared channel or physical control channel). In this situation, in the multiple access physical resource, one slot is a resource block unit in the time domain. Furthermore, the communication system of the present implementation may set the minimum unit for the terminal device 20 mapping physical channel to be one or more OFDM symbols (for example, 2 to 13 OFDM symbols). One or more OFDM symbols of the base station device 10 is a resource block unit in the time domain. The base station device 10 may notify the minimum unit for mapping physical channel to the terminal device 20.

Figure 3:
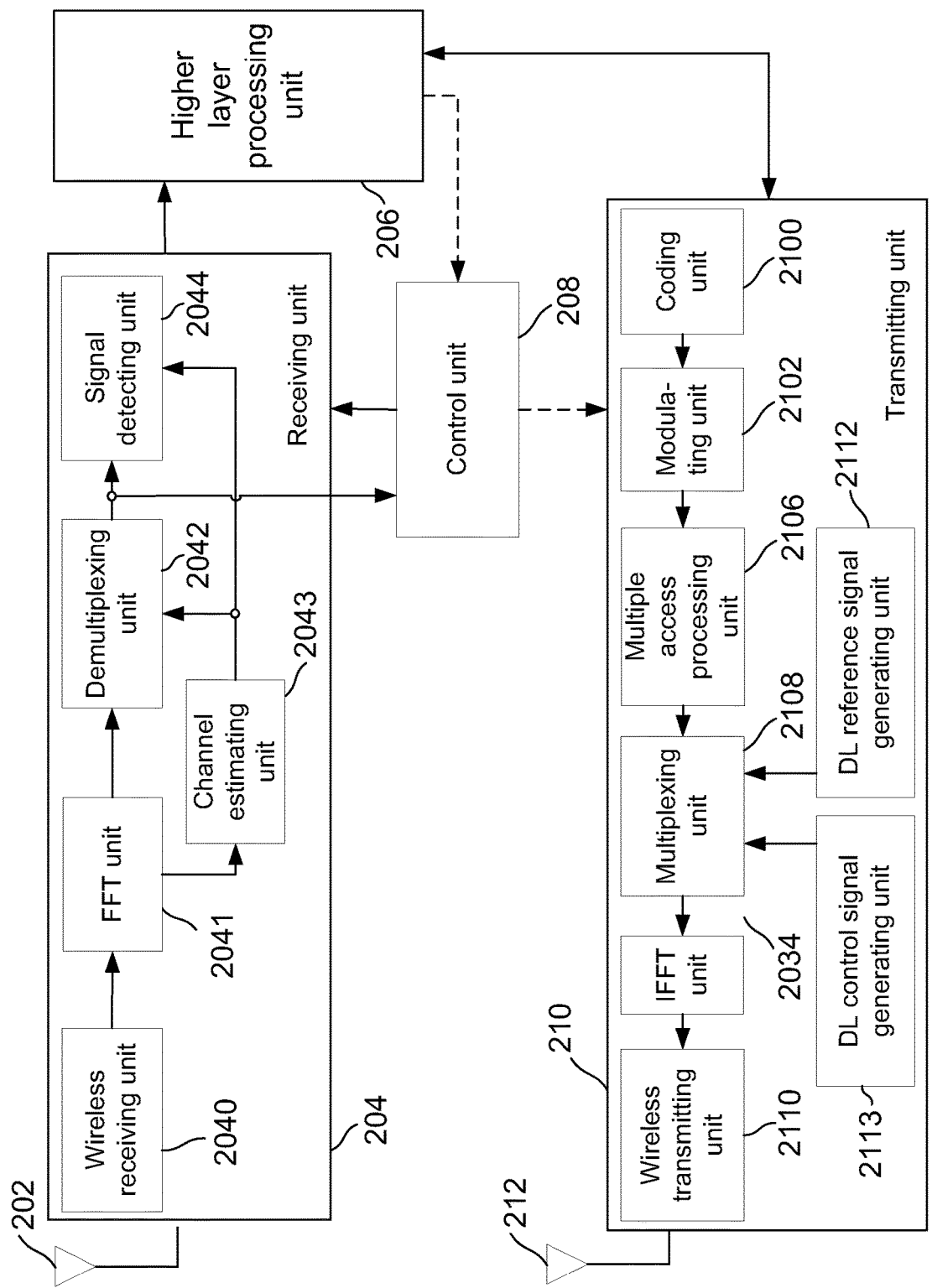
FIG. 3 is a block diagram of a base station device 10 according to a first implementation of the present disclosure.

FIG. 3 is a block diagram of a base station device 10 according to the present disclosure. The base station device 10 includes a receiving antenna 202, a receiving unit (receiving step) 204, a higher layer processing unit (higher layer processing step) 206, a control unit (control step) 208, a transmitting unit (transmitting step) 210, and a transmitting antenna 212. The receiving unit 204 includes a radio receiving unit (wireless receiving step) 2040, an FFT unit 2041 (FFT step), a demultiplexing unit (demultiplexing step) 2042, a channel estimating unit (channel estimating step) 2043, and a signal detecting unit (signal detecting step)

2044. The transmitting unit 210 includes an encoding unit (encoding step) 2100, a modulating unit (modulating step) 2102, a multiple access processing unit (multiple access processing step) 2106, a multiplexing unit (multiplexing step) 2108, a radio transmitting unit (radio transmitting step) 2110, an IFFT unit (IFFT step) 2109, a downlink reference signal generating unit (downlink reference signal generating step) 2112, and a downlink control signal generating unit (downlink control signal generating step) 2113.

The receiving unit 204 demultiplexes, demodulates, and decodes an uplink signal (uplink physical channel, uplink physical signal) received from the terminal device 10 via the receiving antenna 202. The receiving unit 204 outputs a control channel (control information) that is separated from the received signal to the control unit 208. The receiving unit 204 outputs the decoding result to the higher layer processing unit 206. The receiving unit 204 acquires a SR included in the received signal or an ACK/NACK and CSI for downlink data transmission.

The radio receiving unit 2040 converts the uplink signal received via the receiving antenna 202 into a baseband signal by down-conversion, removes undesirable frequency components, controls the amplifying level with the method of maintaining signal level appropriately, quadrature-demodulates based on the in-phase and quadrature components of the received signal, and converts the quadrature-demodulated analog signal into a digital signal. The radio receiving unit 2040 removes a part corresponding to CP (Cyclic Prefix) from the converted digital signal. The FFT unit 2041 performs fast Fourier transform on the downlink signal which the CP has been removed (demodulation processing for OFDM modulation), and extracts a frequency domain signal.

The channel estimating unit 2043 performs channel estimation for signal detection of an uplink physical channel using a demodulation reference signal. The resource that the demodulation reference signal is mapped to and the demodulation reference signal sequence that is assigned to each terminal device are transmitted from the control unit 208 to the channel estimating unit 2043. The channel estimating unit 2043 measures the channel state (transmission path state) between the base station device 10 and the terminal device 20 using the demodulation reference signal sequence. When in the grant-free access, the channel estimating unit 2043 may identify a terminal device (therefore, it is also referred to as an identifying unit) using the result of channel estimating (impulse response and frequency response of the channel state). The channel estimating unit 2043 determines the uplink physical channel that the terminal device 20 transmitted on, wherein the terminal device 20 is associated with the demodulation reference signal that has successfully extracted the channel state. The demultiplexing unit 2042, from the resource determined by the channel estimating unit 2043 that has transmitted the uplink physical channel, extracts frequency domain signal (including signals of the plurality of terminal devices 20) input from the FFT unit 2041.

The demultiplexing unit 2042 separates and extracts uplink physical channels (physical uplink control channels, physical uplink shared channels) included in the extracted uplink signals in the frequency domain. The demultiplexing unit outputs the physical uplink channel to the signal detecting unit 2044/the control unit 208.

The signal detecting unit 2044 uses the channel estimation result estimated by the channel estimating unit 2043 and the frequency domain signal input from the demultiplexing unit 2042 to detect signals of uplink data (uplink physical channel) of each terminal device. The signal detecting unit 2044 performs detection process of signals of the terminal device 20 associated with a demodulation reference signal (that has successfully extracted the channel state) assigned to the terminal device 20 that has determined that uplink data has been transmitted with.

Figure 4:
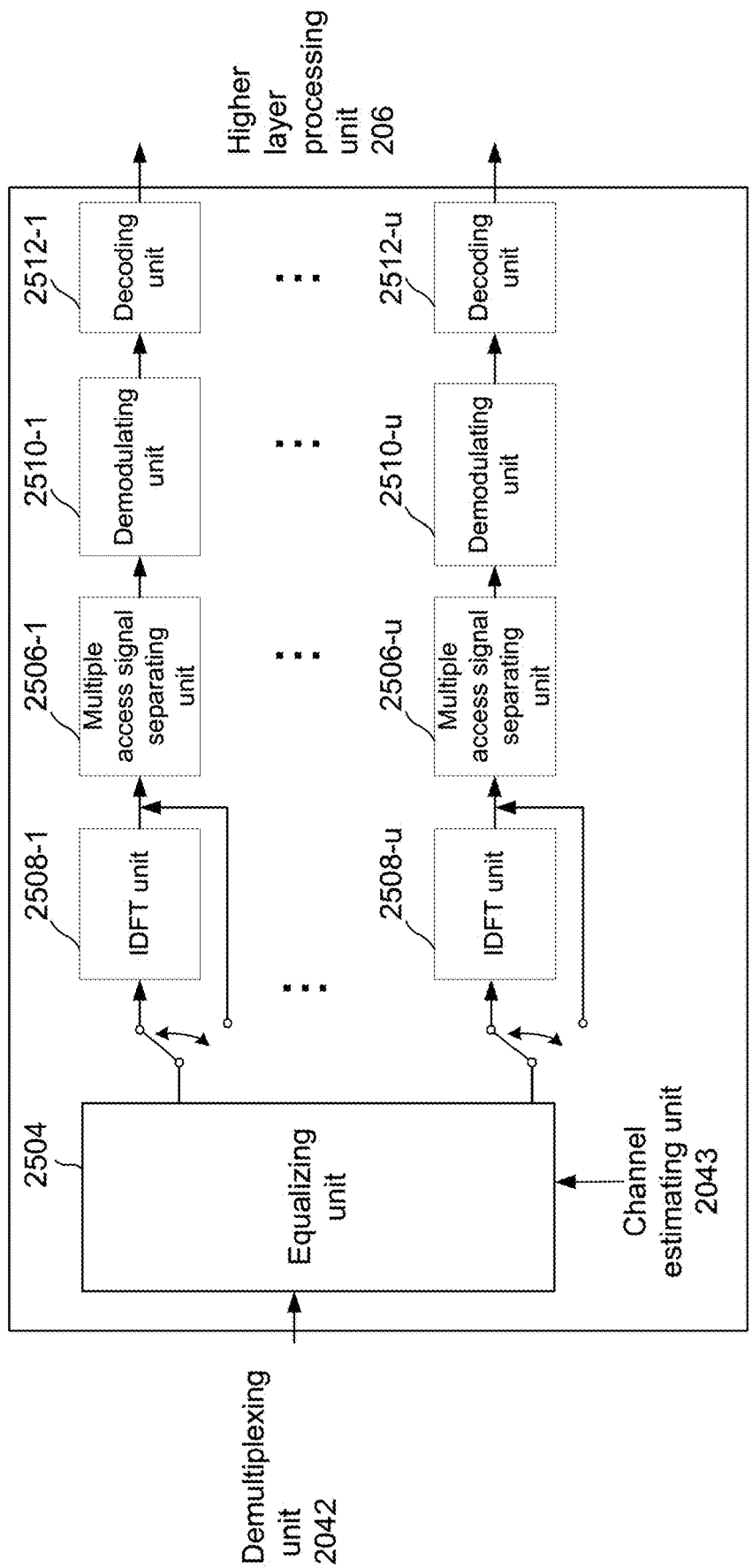
FIG. 4 is a schematic diagram of an example of a signal detecting unit according to a first implementation of the present disclosure.

FIG. 4 is a schematic diagram of an example of a signal detecting unit according to the present disclosure. The signal detecting unit 2044 is composed of an equalizing unit 2504, a multiple access signal separating unit 2506-1 to a multiple access signal separating unit 2506-u, an IDFT unit 2508-1 to an IDFT unit 2508-u, a demodulating unit 2510-1 to a demodulating unit 2510-u, and a decoding unit 2512-1 to a decoding unit 2512-u. The "u" indicates the number of terminal devices in which the channel estimating unit 2043 determined that uplink data has been transmitted (successfully extracted channel state) in the same or overlapping multiple access physical resources (at the same time and at the same frequency) in the situation of the grant-free access. In scheduled access, "u" indicates the number of terminal devices allowed for uplink data transmission in the same or overlapping multiple access physical resources in DCI (at the same time, for example, in OFDM symbols and slots). Each part of the signal detecting unit 2044 is controlled using the grant-free access configuration of each terminal device input from the control unit 208.

The equalizing unit 2504 generates an equalizing weighting based on the MMSE specification according to the frequency response input from the channel estimating unit 2043. Here, the equalizing process may also use MRC or ZF. The equalizing unit 2504 multiplies the equalizing weighting by the frequency domain signal input from the demultiplexing unit 2042 (including the signal of each terminal device), and thereby, extracts the frequency domain signal of each terminal device. The equalizing unit 2504 outputs the frequency domain signal of each terminal device after equalizing to the IDFT units 2508-1 to 2508-u. Here, when detecting data transmitted by the terminal device 20 that sets the signal waveform to DFTS-OFDM, the frequency domain signal is output to the IDFT units 2508-1 to 2508-u. Furthermore, when receiving data transmitted by the terminal device 20 that sets the signal waveform to OFDM, the frequency domain signal is output to the multiple access signal separating units 2506-1 to 2506-u.

The IDFT units 2508-1 to 2508-u convert the frequency domain signal of each terminal device after equalizing into time domain signals. Furthermore, the IDFT units 2508-1 to 2508-u correspond to the processing implemented by the DFT unit of the terminal device 20. The multiple access signal separating units 2506-1 to 2506-u separate the signals multiplexed using the multiple access signature resource for the time domain signal of each terminal device after the IDFT (multiple access signal separating processing). For example, when code spreading is used as a multiple access signature resource, each of the multiple access signal separating units 2506-1 to 2506-u performs a de-spreading process using a spreading code sequence assigned to each terminal device. Furthermore, when interleaving is applied as a multiple access signature resource, a de-interleaving process is performed on a time domain signal of each terminal device after IDFT (de-interleaving unit).

The modulation scheme information (BPSK, QPSK, 16QAM, 64QAM, 256QAM, etc.) notified or predetermined to each terminal device in advance is input to the demodulating units 2510-1 to 2510-u from the control unit 208. The demodulating units 2510-1 to 2510-u, based on the modulation scheme information, perform demodulating processing on the signal after the multiple access signal separating, and output a bit sequence LLR (Log Likelihood Ratio).

Information of a previously notified coding rate or a predetermined coding rate is input from the control unit 208 to the decoding units 2512-1 to 2512-$u$. The decoding units 2512-1 to 2512-$u$ perform a decoding process of the LLR sequence output from the demodulation units 2510-1 to 2510-$u$, and output the uplink data/uplink control information from decoding to the higher layer processing unit 206. In order to perform a cancellation process such as a successive interference canceller (SIC) or turbo equalization, the decoding units 2512-1 to 2512-$u$ generate replicas from external LLRs or posterior LLRs of decoding unit outputs, and perform the cancellation process. The difference between the external LLR and the posterior LLR is whether the prior LLR that is input to each of the decoding units 2512-1 to 2512-$u$ is subtracted from the LLR after decoding. When the number of repetitions of SIC or turbo equalization reaches a predetermined number, the decoding units 2512-1 to 2512-$u$ perform a hard determination of the LLRs after decoding, and output the bit sequence of the uplink data of each terminal device to the higher layer processing unit 206. Furthermore, it is not limited to signal detection using turbo equalizing process, but also generate replicas using signal detection, maximum likelihood detection, EMMSE-IRC without interference cancellation.

The control unit 208 controls the receiving unit 204 and the transmitting unit 210 using the configuration information related to uplink receiving/the configuration information related to downlink transmitting (through DCI or RRC, SIB etc, notified from the base station device to the terminal device) included in an uplink physical channel (physical uplink control channel, physical uplink shared channel, etc.). The control unit 208 acquires from the higher layer processing unit 206 the configuration information related to uplink receiving/the configuration information related to downlink transmitting. When the transmitting unit 210 transmits the physical downlink control channel, the control unit 208 generates the downlink control information (DCI) and outputs it to the transmitting unit 210. Furthermore, a part of the functions of the control unit 108 may be included in the higher layer processing unit 102. Furthermore, the control unit 208 may control the transmitting unit 210 according to the CP length parameter appended to the data signal.

The higher layer processing unit 206 performs higher layer processing via a physical layer including a medium access control (MAC) layer, a packet data convergence protocol (PDCP) layer, a radio link control (RLC) layer, and a radio resource control (RRC) layer. The higher layer processing unit 206 generates information required for controlling the transmitting unit 210 and the receiving unit 204, and outputs the information to the control unit 208. The higher layer processing unit 206 outputs to the transmitting unit 210 the downlink data (for example, DL-SCH), broadcast information (for example, BCH), hybrid automatic repeat request indicator (HARQ indicator), and the like. The higher layer processing unit 206 input, from the receiving unit 204, information related to the terminal device function (UE capability) supported by the terminal device. For example, the higher layer processing unit 206 receives information related to the terminal device function via signaling of the RRC layer.

The information related to the terminal device function includes information indicating whether the terminal device supports a specified function, or information indicating that the terminal device has completed the installation and testing for the specified function. Whether a specified function is supported includes whether the installation and testing for the specified function has been completed. When the terminal device supports a specified function, the terminal device transmits the information (parameter) indicating whether the terminal device supports the specified function. When the terminal device does not support the specified function, the terminal device may not transmit information (parameter) indicating whether the terminal device supports the specified function. That is, whether or not to support a specified function is notified by whether the information (parameter) is transmitted, wherein the information indicates whether the specified function is supported. Furthermore, the information (parameter) indicating whether a specified function is supported may also be notified using one bit of 1 or 0.

The information related to the terminal device function includes information indicating that the grant-free access is supported (information related to whether configured UL grant type 1 and configured UL grant type 2 are supported respectively). When there are a plurality of functions corresponding to the grant-free access, the higher layer processing unit 206 may receive information indicating whether each function is supported. The information indicating that the grant-free access is supported includes information indicating that the terminal device supports a multiple access physical resource and a multiple access signature resource. The information indicating that the grant-free access is supported may include a reference table setting for setting of the multiple access physical resource and the multiple access signature resource. The information indicating that the grant-free access is supported includes a part or all capabilities corresponding to a plurality of tables indicating antenna ports, scrambling identification and the number of layers, capabilities corresponding to a predetermined number of antenna ports, and capabilities corresponding to a predetermined transmission mode. The transmission mode may be determined by the number of antenna ports, transmitting diversity, the number of layers, and whether the grant-free access is supported.

The information related to the terminal device function may also include information indicating the function related to the URLLC is supported. For example, the DCI format of dynamic scheduling of uplink or dynamic scheduling of SPS/grant-free access or dynamic scheduling or SPS of downlink includes a compact DCI format that the total number of information bits of fields in the DCI format is small, related to the terminal device function includes the receiving processing information (blind decoding) indicating that the compact DCI format is supported. The DCI format is configured and transmitted in the search space of the PDCCH, however, the number of resources can be used for each aggregation level is fixed. Therefore, when the total number of information bits of fields in the DCI format is large, transmission of a high coding rate is performed; and, when the total number of bits of fields in the DCI format is small, transmission of a low coding rate is performed. Therefore, when high reliability such as URLLC is required, the compact DCI format is preferred. Furthermore, in LTE and NR, the DCI format is configured in a predetermined resource element (search space). Therefore, if the number of resource elements (aggregation level) is fixed, a DCI format having a large payload size is transmitted at a higher coding rate than a DCI format having a small payload size, and it is difficult to satisfy high reliability.

The information related to the terminal device function may also include information indicating the function related to the URLLC is supported. For example, the following information bay be included, the information indicating that repeatedly transmitting the DCI format of dynamic scheduling of the uplink and the downlink is supported, information indicating that detecting the PDCCH with high reliability (performing detection using blind decoding) is supported. When repeatedly transmitting the information of the DCI format on the PDCCH, the base station device may be associated to a blind decoding candidate, an aggregation level, a search space, a CORESET, a BWP, a serving cell, and a slot in a repeatedly transmitted search space, and information of repeatedly transmitting the same DCI format according to the specified rules.

The information related to the terminal device function may include information indicating that the terminal device supports a function related to carrier aggregation. Furthermore, the information related to the terminal device function may also include information indicating that a function related to simultaneously transmitting (including multiplexing of time domain and multiplexing at least a part of OFDM symbols) of a plurality of component carriers (serving cells) is supported.

The higher layer processing unit 206 manages various setting information of the terminal device. A part of the various setting information is input to the control unit 208. The various setting information is transmitted from the base station device 10 using the downlink physical channel via the transmitting unit 210. The various setting information includes setting information regarding the grant-free access input from the transmitting unit 210. The setting information related to the grant-free access includes setting information of a multiple access resource (multiple access physical resource, multiple access signature resource). For example, it may include uplink resource block setting (using start position of OFDM symbol and number of OFDM symbols/number of resource blocks), setting of demodulation reference signal/identification signal (reference signal sequence, cyclic shift, mapped OFDM symbol, etc.), spreading code setting (Walsh code, Orthogonal Cover Code (OCC), sparse code or spreading factor of the spreading codes, etc.), interleave setting, transmission power setting, transmitting and receiving antenna setting, transmitting and receiving beamforming setting, etc. (setting related to a process implemented based on a mark for identifying an uplink physical channel transmitted by the terminal device 20). The multiple access signature resources may be associated directly or indirectly. The association of a multiple access signature resource is indicated by a multiple access signature process index. Furthermore, the setting information on the grant-free access may include a reference table setting for setting the multiple access physical resource and the multiple access signature resource. The setting information related to the grant-free access may also include information indicating configuration of the grant-free access, resource information, ACK/NACK receiving timing information for uplink data signal, retransmission timing information of uplink data signal.

The higher layer processing unit 206, based on the setting information of the grant-free access that is notified as control information, manage the uplink data (transport block) multiple access resources (multiple access physical resources, multiple access signature resources) in a grant-free manner. The higher layer processing unit 206, based on the setting information of the grant-free access, outputs information used for controlling the receiving unit 204 to the control unit 208.

The higher layer processing unit 206 outputs the generated downlink data (for example, DL-SCH) to the transmitting unit 210. The downlink data may include a field stored with a UE ID (RNTI). The higher layer processing unit 206 appends a CRC to the downlink data. The CRC parity bit is generated using the downlink data. The CRC parity bits are scrambled (also referred to as exclusive OR operation, masking, and encrypting) with the UE ID (RNTI) assigned to the destination terminal device. However, as described above, there are a plurality of types of RNTI, and the RNTI being used differs according to the transmitted data.

The higher layer processing unit 206 generates or acquires from a higher node broadcast system information (MIB, SIB). The higher layer processing unit 206 outputs the broadcast system information to the transmitting unit 210. The broadcast system information may include information indicating that the base station device 10 supports the grant-free access. The higher layer processing unit 206 may include a part or all of setting information related to the grant-free access (setting information related to a multiple access resource such as multiple access physical resource and multiple access signature resource) in the system information. The uplink in the system information in the transmitting unit 210 may be mapped to a physical broadcast channel/physical downlink shared channel.

The higher layer processing unit 206 generates or acquires from a higher node downlink data (transport block), system information (SIB), RRC message, MAC CE, that are mapped to the physical downlink shared channel, and outputs to the transmitting unit 210. The higher layer processing unit 206 may include, in these higher layer signals, a part or all of the configuration information related to the grant-free access, information indicating the grant-free access configuration, and resource parameters. The higher layer processing unit 206 may also generate a dedicated SIB for notifying the configuration information regarding grant-free access.

The higher layer processing unit 206 maps the multiple access resource to the terminal device 20 that supports the grant-free access. The base station device 10 may keep the reference table related to the setting parameters of the multiple access signature resource. The higher layer processing unit 206 assigns respective setting parameter to the terminal device 20. The higher layer processing unit 206 generates setting information related to the grant-free access for each terminal device using the multiple access signature resource. The higher layer processing unit 206 generates a downlink shared channel including a part or all of setting information related to the grant-free access for each terminal device. The higher layer processing unit 206 outputs the setting information related to the grant-free access to the control unit 208/the transmitting unit 210.

The higher layer processing unit 206 sets and notifies a UE ID for each terminal device. The UE ID may use a cell network temporary identifier (RNTI). The UE ID is used for scrambling the CRC that is appended to the downlink control channel and the downlink shared channel. The UE ID is used for scrambling the CRC that is appended to the uplink shared channel. The UE ID is used for generating an uplink reference signal sequence. The higher layer processing unit 206 may set a UE ID specific to SPS/the grant-free access. The higher layer processing unit 206 may distinguish and set the UE ID according to whether the terminal device supports the grant-free access. For example, when the downlink physical channel is transmitted by the scheduled access and the uplink physical channel is transmitted by the grant-free access, the downlink physical channel UE ID may be set and distinguished from the downlink physical channel UE ID. The higher layer processing unit 206 outputs the setting information related to the UE ID to the transmitting unit 210/the control unit 208/the receiving unit 204.

The higher layer processing unit 206 determines the coding rate, modulation scheme (or MCS), transmission power, and others of a physical channel (physical downlink shared channel, physical uplink shared channel, and the like). The higher layer processing unit 206 outputs the coding rate/the modulation scheme/the transmission power to the transmitting unit 210/the control unit 208/the receiving unit 204. The higher layer processing unit 206 may include the coding rate/the modulation scheme/the transmission power in a higher layer signal.

The transmitting unit 210 transmits a physical downlink shared channel when downlink data to be transmitted occurs. Furthermore, the transmitting unit 210, when transmitting a resource for data transmission according to DL Grant, the transmitting unit 210 may transmit a physical downlink shared channel by the scheduled access, and transmit a physical downlink shared channel of SPS when activating SPS. The transmitting unit 210 generates a physical downlink shared channel and corresponding demodulation reference signal/control signal according to the settings related to the scheduled access/SPS input from the control unit 208.

The encoding unit 2100 encodes downlink data input from the higher layer processing unit 206 (including re-encoding) using a predetermined encoding method/an encoding method set by the control unit 208. The encoding method may implement convolutional coding, turbo coding, LDPC (Low Density Parity Check) coding, Polar coding, or the like. When the LDPC coding is used in data transmission, a Polar code may be used in transmitting the control information, and different error correction coding may be used according to the downlink channel used. Furthermore, different error correction coding may be used according to the size of transmission data or the control information. For example, when the data size is smaller than a predetermined value, a convolutional code is used; alternatively, the error correction coding may also be used. The coding may use a mother code having a coding rate of 1/3, or a low coding rate of 1/6 or 1/12. Furthermore, when using a coding rate higher than the mother code, a coding rate of data transmission may be realized by rate matching (puncturing). The modulating unit 2102 modulates the code bits input from the encoding unit 2100 using the modulation scheme notified by the downlink control information, like BPSK, QPSK, 16QAM, 64QAM, 256QAM (may also include n/2 shift BPSK and n/4 shift QPSK), or a modulation scheme predetermined for the channel.

The multiple access processing unit 2106 converts the signals for the sequence output from the modulating unit 2102 according to the multiple access signature resource input from the control unit 208, and thereby, allows the base station device 10 to detect a signal even when multiplexing a plurality of data. When the multiple access signature resource is spread, the spreading code sequence is multiplied according to the setting of the spreading code sequence. Furthermore, when the multiple access processing unit 2106 set the interleaving as the multiple access signature resource, the multiple access processing unit 2106 may be replaced with an interleave unit. The interleaving unit performs an interleaving process on the sequence output from the modulating unit 2102 according to the setting of the interleaving pattern input from the control unit 208. When code spreading and interleaving are set as the multiple access signature resource, the transmitting unit 210 of the multiple access processing unit 2106 perform spreading processing and interleaving. Similarly, the sparse codes or others may be applied even when other multiple access signature resources are applied.

When the signal waveform is set to OFDM, the multiple access processing unit 2106 inputs the signal after the multiple access processing to the multiplexing unit 2108. The downlink reference signal generation unit 2112 generates a demodulation reference signal according to the setting information of the demodulation reference signal input from the control unit 208. The setting information of the demodulation reference signal/identification signal, based on the number of OFDM symbols notified by the base station device in the downlink control information, the OFDM symbol position of the configured DMRS, cyclic shift, and time domain spreading, generates a sequence that is determined by a predetermined rule.

The multiplexing unit 2108 multiplexes (maps and configures) downlink physical channels and downlink reference signals to the resource elements for transmission antenna port. When using the SCMA, the multiplexing unit 2108 configures the downlink physical channel in a resource element according to the SCMA resource pattern input from the control unit 208.

The IFFT unit 2109 performs an inverse fast Fourier transform on the multiplexed signal, performs modulation with the OFDM method to generate OFDM symbols. The radio transmitting unit 2110 appends a CP to the symbol that is modulated with the OFDM method to generate a baseband digital signal. Furthermore, the radio transmitting unit 2110 converts the baseband digital signal into an analog signal, removes undesirable frequency components, converts the baseband digital signal into a carrier frequency by up-conversion, amplifies power, and transmits to the terminal device 20 via the transmitting antenna 212. The radio transmitting unit 2110 includes a transmission power control function (transmission power control unit). The transmission power control is performed according to the transmission power setting information input from the control unit 208. Furthermore, when the FBMC, UF-OFDM, or F-OFDM is applied, the OFDM symbol is filtered based on a subcarrier unit or a sub-band unit.

Figure 5:
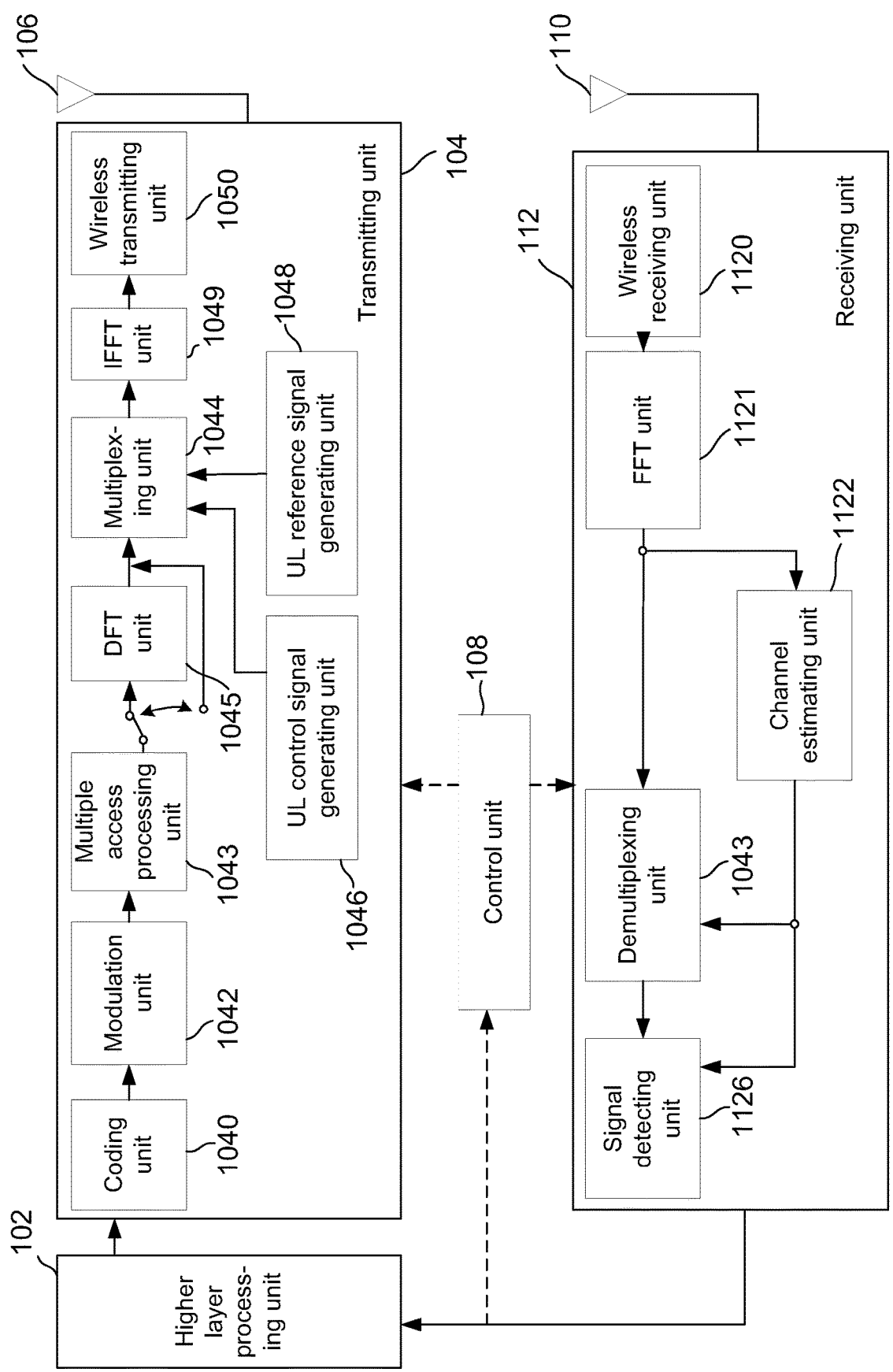
FIG. 5 is a block diagram of a terminal device 20 according to a first implementation of the present disclosure.

FIG. 5 is a block diagram of a terminal device 20 according to the present disclosure. The terminal device 20 includes a higher layer processing unit (higher layer processing step) 102, a transmitting unit (transmitting step) 104, a transmitting antenna 106, a control unit (control step) 108, a receiving antenna 110, and a receiving unit (receiving step) 112. The transmitting unit 104 includes an encoding unit (encoding step) 1040, a modulating unit (modulating step) 1042, a multiple access processing unit (multiple access processing step) 1043, a multiplexing unit (multiplexing step) 1044, and a DFT unit (DFT step) 1045, an uplink control signal generating unit (uplink control signal generating step) 1046, an uplink reference signal generating unit (uplink reference signal generating step) 1048, an IFFT unit 1049 (IFFT step), and a radio transmitting unit (radio transmitting step) 1050. The receiving unit 112 includes a radio receiving unit (radio receiving step) 1120, a FFT unit (FFT step) 1121, a channel estimating unit (channel estimating step) 1122, a demultiplexing unit (demultiplexing step) 1124, and a signal detecting unit (signal detecting step) 1126.

The higher layer processing unit 102 performs processing of the higher layer through physical layer such as a medium access control (MAC) layer, a packet data convergence protocol (PDCP) layer, a radio link control (RLC) layer, and a radio resource control (RRC) layer. The higher layer processing unit 102 generates information required for controlling the transmitting unit 104 and the receiving unit 112, and outputs the information to the control unit 108. The higher layer processing unit 102 outputs uplink data (for example, UL-SCH), the uplink control information to the transmitting unit 104.

The higher layer processing unit 102 transmits information related to the terminal device, such as the terminal device function (UE capability), from the base station device 10 (via the transmitting unit 104). The information related to the terminal device is information indicating that the grant-free access and receiving/detecting/blind-decoding of compact DCI are supported, information indicating that the receiving/detecting/blind-decoding is performed when information of the DCI format is repeatedly transmitted on the PDCCH, and information indicating whether each function is supported. The information indicating that the grant-free access is supported and the information indicating whether each function is supported may be distinguished by the transmission mode.

The control unit 108 controls the transmitting unit 104 and the receiving unit 112 based on various setting information input from the higher layer processing unit 102. The control unit 108 generates the uplink control information (UCI) based on the setting information related to the control information input from the higher layer processing unit 102, and outputs it to the transmitting unit 104.

The transmitting unit 104 performs encoding and modulating the uplink control information and the uplink shared channel input from the higher layer processing unit 102 for each terminal device, and generates a physical uplink control channel and a physical uplink shared channel. The encoding unit 1040 encodes (including re-encoding) the uplink control information and the uplink shared channel (including repetition) using a predetermined encoding method/the control information as notified. The encoding method may implement convolutional coding, turbo coding, LDPC (Low Density Parity Check) coding, Polar coding, or the like. The modulating unit 1042 modulates the code bits input from the encoding unit 1040 using the predetermined modulation scheme/the modulation scheme as notified, like BPSK, QPSK, 16QAM, 64QAM, 256QAM.

The multiple access processing unit 1043 converts the signals for the sequence output from the modulating unit 1042 according to the multiple access signature resource input from the control unit 108, and thereby, allows the base station device 10 to detect a signal even when multiplexing a plurality of data. When the multiple access signature resource is spread, the spreading code sequence is multiplied according to the setting of the spreading code sequence. The setting of the spreading code sequence may be associated with other setting related to the grant-free access, such as the demodulation reference signal/identification signal. Furthermore, the multiple access processing may also be performed on the sequence after the DFT processing. Furthermore, when the multiple access processing unit 1043 set the interleaving as the multiple access signature resource, the multiple access processing unit 1043 may be replaced with an interleave unit. The interleaving unit performs an interleaving process on the sequence output from the DFT unit according to the setting of the interleaving pattern input from the control unit 108. When code spreading and interleaving are set as the multiple access signature resource, the transmitting unit 104 of the multiple access processing unit 1043 perform spreading processing and interleaving. Similarly, the sparse codes or others may be applied even when other multiple access signature resources are applied.

The multiple access processing unit 1043 inputs the signal after the multiple access processing to the DFT unit 1045 or the multiplexing unit 1044 according to whether the signal waveform is set to DFTS-OFDM or OFDM. When the signal waveform is set to DFTS-OFDM, the DFT unit 1045 sorts the modulation symbols output from multiple access processing unit 1043 after the multiple access processing in parallel, and performs discrete Fourier transform (DFT) processing. Here, a DFT may be performed by appending a zero symbol sequence to the modulation symbol, and thereby, a signal waveform is formed to replace the CP by using zero interval in the time signal after the IFFT. Furthermore, a specific sequence like a Gold sequence or a Zadoff-Chu sequence may be appended to the modulation symbol to perform DFT, and thereby, a signal waveform is formed using a specific pattern instead of the CP for the time signal after IFFT. When the signal waveform is set to OFDM, because DFT is not applied, the signal after the multiple access processing is input to the multiplexing unit 1044. The control unit 108 performs control using the zero symbol sequence setting (the number of bits of the symbol sequence) and the specific sequence setting (sequence type (seed), sequence length) included in the setting information related to the grant-free access.

The uplink control signal generating unit 1046 appends a CRC to the uplink control information input from the control unit 108, and generates a physical uplink control channel. The uplink reference signal generating unit 1048 generates an uplink reference signal.

The multiplexing unit 1044 maps the modulation symbol of each uplink physical channel that is modulated by the multiple access processing unit 1043 or the DFT unit 1045, the physical uplink control channel, and the uplink reference signal to the resource elements. The multiplexing unit 1044 maps the physical uplink shared channel and the physical uplink control channel to resources assigned to each terminal device.

The IFFT unit 1049 performs an inverse fast Fourier transform (IFFT) on the multiplexed modulation symbol of each uplink physical channel and generates the OFDM symbol. The radio transmitting unit 1050 appends a cyclic prefix (CP) to the OFDM symbol to generate a baseband digital signal. Furthermore, the radio transmitting unit 1050 converts the digital signal into an analog signal, removes undesirable frequency components by filtering, up-converts the carrier signal to a carrier frequency, amplifies power, and outputs the signal to the transmitting antenna 106 for transmission.

The receiving unit 112 detects a downlink physical channel transmitted from base station device 10 using a demodulation reference signal. The receiving unit 112 detects a downlink physical channel based on the setting information notified from the base station device by control information (DCI, RRC, SIB, etc.). Here, the receiving unit 112 performs blind decoding a predetermined candidate or a candidate notified by the higher layer control information (RRC signaling) for a search space included in the PDCCH. After blind decoding, the receiving unit 112 uses the CRC that is scrambled with C-RNTI, CS-RNTI, INT-RNTI (may exist in both downlink and uplink may be present) or other RNTIs to detect DCI. The blind decoding may be performed by the signal detecting unit 1126 in the receiving unit 112, although not shown in the drawings, but may also include the control signal detecting unit, and blind decoding is performed by the control signal detecting unit.

The radio receiving unit 1120 converts the uplink signal received via the receiving antenna 110 into a baseband signal by down-conversion, removes undesirable frequency components, controls the amplifying level with the method of maintaining signal level appropriately, performs quadrature demodulation based on the in-phase and quadrature components of the received signal, and converts the quadrature-demodulated analog signal into a digital signal. The radio receiving unit 1120 removes a part corresponding to CP from the converted digital signal. The FFT unit 1121 performs fast Fourier transform (FFT) on the downlink signal which the CP has been removed, and extracts a frequency domain signal.

The channel estimating unit 1122 performs channel estimation for signal detection of a downlink physical channel using a demodulation reference signal. The resource that the demodulation reference signal is mapped to and the demodulation reference signal sequence that is assigned to each terminal device are transmitted from the control unit 108 to the channel estimating unit 1122. The channel estimating unit 1122 measures the channel state (transmission path state) between the base station device 10 and the terminal device 20 using the demodulation reference signal sequence. The demultiplexing unit 1124 extracts a signal in the frequency domain (including signals of a plurality of terminal devices 20) input from the radio receiving unit 1120. The signal detecting unit 1126 detects a downlink data (uplink physical channel) signal using the channel estimation result and the frequency domain signal input from the demultiplexing unit 1124.

The higher layer processing unit 102 acquires downlink data (bit sequence after the hard determination) from the signal detecting unit 1126. The higher layer processing unit 102 performs descrambling (exclusive OR operation) of the CRC included in the post-decoding downlink data of each terminal device, using the UE ID (RNTI) assigned to each terminal. When the results of error detection in the descrambling indicates that there is no error in the downlink data, the higher layer processing unit 102 determines that the downlink data has been correctly received.

Figure 6:
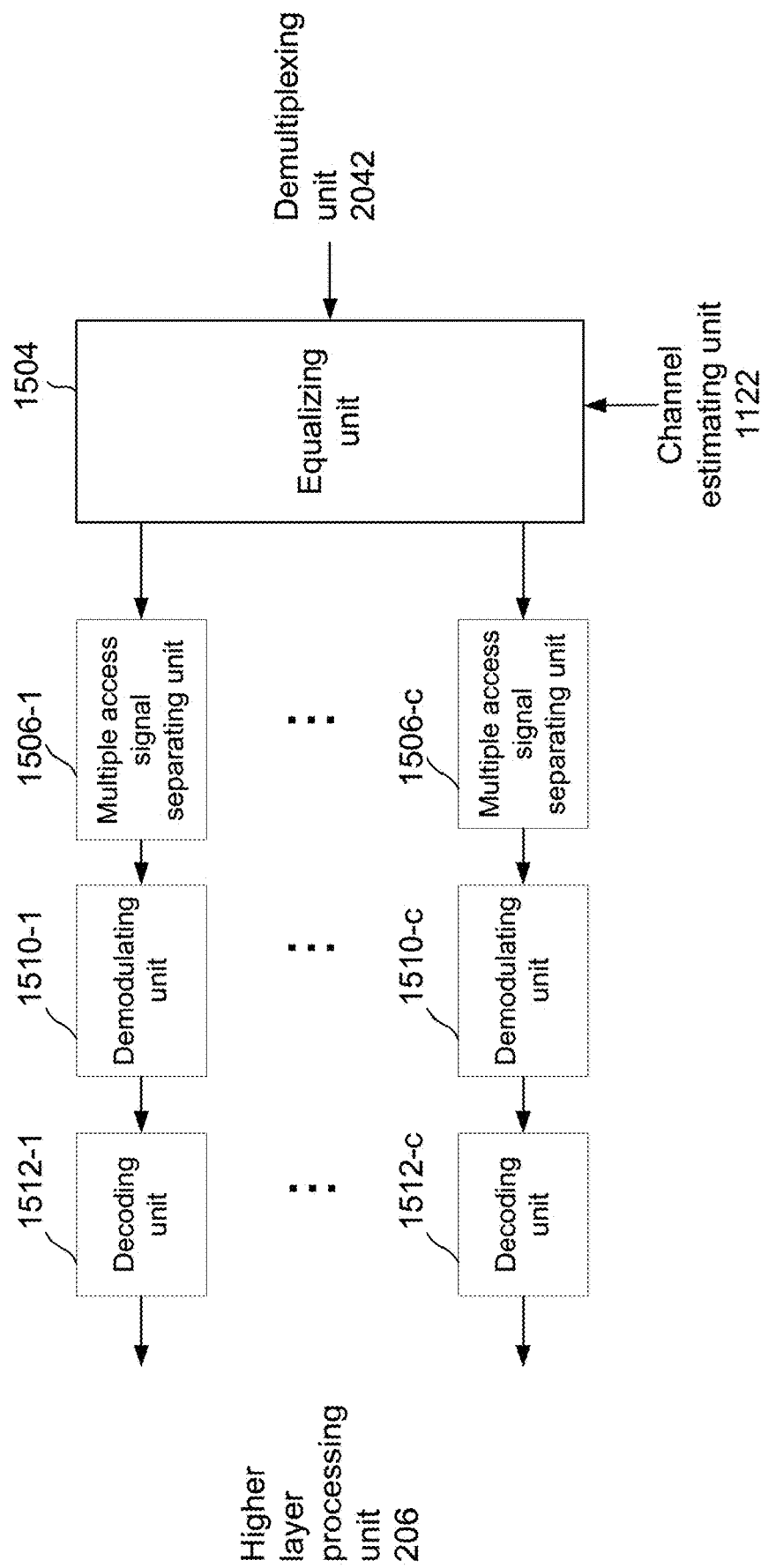
FIG. 6 is a schematic diagram of an example of a signal detecting unit according to a first implementation of the present disclosure.

FIG. 6 is a schematic diagram of an example of a signal detecting unit according to the present disclosure. The signal detecting unit 1126 is composed of an equalizing unit 1504, a multiple access signal separating unit 1506-1 to a multiple access signal separating unit 1506-c, a demodulation unit 1510-1 to a demodulation unit 1510-c, and a decoding unit 1512-1 to a decoding unit 1512-c.

The equalizing unit 1504 generates an equalizing weighting based on the MMSE specification according to the frequency response input from the channel estimating unit 1122. Here, the equalizing process may also use MRC or ZF. The equalizing unit 1504 multiplies the equalizing weighting by the frequency domain signal input from the demultiplexing unit 1124, and thereby, extracts the frequency domain signal. The equalizing unit 1504 outputs the post-equalizing frequency domain signal to the multiple access signal separating units 1506-1 to 1506-c. "c" is 1 or more, and is the number of signals received in the same subframe, the same slot, and the same OFDM symbol. For example, the number of PUSCH and PUCCH. Other downlink channels may be received at the same timing.

The multiple access signal separating units 1506-1 to 1506-c separate the signals multiplexed using the multiple access signature resource for the frequency domain signal (multiple access signal separating processing). For example, when code spreading is used as a multiple access signature resource, each of the multiple access signal separating units 1506-1 to 1506-c performs a de-spreading process using the spreading code sequence used. Furthermore, when interleaving is applied as a multiple access signature resource, a de-interleaving process is performed on a time domain signal (de-interleaving unit).

The modulation scheme information notified or predetermined to each terminal device in advance is input to the demodulating units 1510-1 to 1510-c from the control unit 108. The demodulating units 1510-1 to 1510-c, based on the modulation scheme information, perform demodulating processing on the signal after the multiple access signal separating, and output a bit sequence LLR (Log Likelihood Ratio).

Information of a previously notified coding rate or a predetermined coding rate is input from the control unit 108 to the decoding units 1512-1 to 1512-c. The decoding units 1512-1 to 1512-c perform a decoding process of the LLR sequence output from the demodulation units 1510-1 to 1510-c. In order to perform a cancellation process such as a successive interference canceller (SIC) or turbo equalization, the decoding units 1512-1 to 1512-c generate replicas from external LLRs or posterior LLRs of decoding unit outputs, and perform the cancellation process. The difference between the external LLR and the posterior LLR is whether the prior LLR that is input to each of the decoding units 1512-1 to 1512-c is subtracted from the LLR after decoding.

Figure 7:
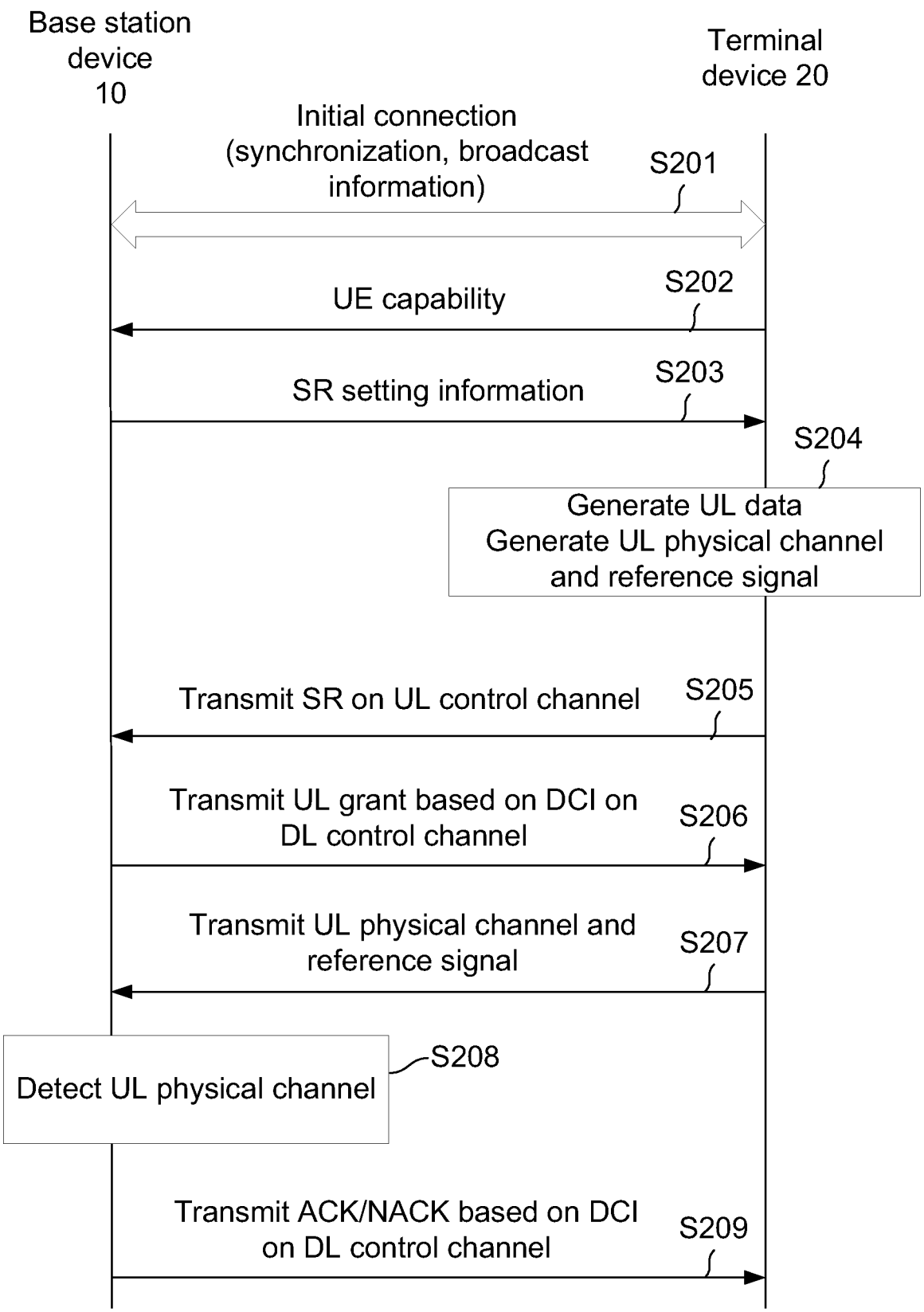
FIG. 7 is a time sequence diagram of an example of uplink data transmission in dynamic scheduling.

FIG. 7 is a time sequence diagram of an example of uplink data transmission in dynamic scheduling. The base station device 10 periodically transmits a synchronization signal and a broadcast channel in a downlink according to a predetermined radio frame format. The terminal device 20 performs an initial connection (S201) using a synchronization signal and a broadcast channel. The terminal device 20 performs frame synchronization and symbol synchronization in the downlink using the synchronization signal. When the broadcast channel includes setting information related to the grant-free access, the terminal device 20 acquires the setting related to the grant-free access in the connected cell. The base station device 10 may notify each terminal device 20 of the UE ID in the initial connection.

The terminal device 20 transmits UE capability (S202). The base station device 10 may use the UE capability to determine whether the terminal device 20 supports the grant-free access, whether supports the URLLC data transmission, whether supports eMBB data transmission, whether supports transmitting multiple types of SRs, whether supports using different MCS tables for data transmission, whether supports detecting compact DCI with fewer bits than DCI formats 0_0 and 0_1, whether supports detecting DCI format that is transmitted repeatedly, whether supports detecting the group common DCI. Furthermore, at S201 to S203, the terminal device 20 may transmit a physical random access channel, and thereby, acquire resources for uplink synchronization or an RRC connection request.

The base station device 10 transmits setting information of a scheduling request (SR) for requesting a radio resource for uplink data transmission to each of the terminal devices 20 using the RRC message and the SIB (S203). Here, the setting information of two types of scheduling requests (SRs) for requesting radio resources for uplink data transmission may be transmitted to each of the terminal devices 20. Here, the setting of SR may set a plurality of PUCCH formats (0 or 1) to be used, resources of the PUCCH, a period of a transmission prohibition timer after transmitting the SR, a maximum number of SR transmissions, a period and an offset of the SR that can be transmitted, but it corresponds to a plurality of serving cells, BWP, and the PUCCH format to be used. Furthermore, the two types of settings for the uplink eMBB SR and the uplink URLLC SR may be notified. Furthermore, the base station device may notify the setting information of three or more types of SR including the SR for mMTC.

Regarding an example of a method of notifying the SR for the eMBB and the URLLC, through a higher layer signal, like RRC, one or more settings (one or more sets) in a plurality of SR transmission settings (using PUCCH resource, PUCCH format, a period and an offset of the SR that can be transmitted, a period of a transmission prohibition timer after transmitting the SR, a maximum number of SR transmissions as one set) may be specified as a transmission setting of the SR for URLLC. Furthermore, one or more IDs may be specified for the transmission setting of a URLLC SR using a higher layer signal, like RRC, according to and ID (SchedulingRequestId) indicating a set of the maximum number of times of transmission of the SR, the period of the transmission prohibition timer after transmitting the SR. Furthermore, one or more IDs may be specified for the transmission setting of a URLLC SR using a higher layer signal, like RRC, according to an ID (SchedulingRequestResourceId) indicating a set of PUCCH resource, PUCCH format, SR period and offset.

As described above, when the transmission setting of the URLLC SR is notified using the set of the transmission setting of the SR or any ID, and a plurality of sets or a plurality of IDs are specified for the transmission setting of the URLLC SR, a specified number is set to valid, the invalid settings may be switched to valid by switching the BWP or the activation/deactivation of the serving cell. Specifically, when the base station device specifies three sets or IDs as the transmission setting of the URLLC SR and sets only one transmission setting of the transmission settings of the URLLC SR to be valid, and when the SR is transmitted with the valid transmission setting of the URLLC SR, this SR transmission becomes a URLLC scheduling request, and the SR transmission based on the other two specified SR transmission settings of the URLLC become eMBB scheduling requests. This is because the associated BWP may become invalid even if the SR transmission setting is performed. Therefore, when a plurality of sets or IDs are specified as the transmission setting of the URLLC SR, priority information may be added, and the set or ID associated with the high priority and valid BWP may be set as the transmission setting of the URLLC SR. Furthermore, regarding the setting of the priority, which may not be set according to the setting information of the SR, but the type of BWP, serving cells, PCell/PSCell/Scell (for example, PCell priority), the type of cell group (CG) (for example, MCG priority), whether is SUL (for example, SUL priority), a set subcarrier interval (for example, a wider subcarrier interval priority), or the unit of the set PUCCH format. Furthermore, four BWPs may be set in one serving cell, and only one BWP may be valid.

In this way, if the transmission setting of the URLLC SR is specified according to a set of transmission settings of a plurality of SRs or a plurality of IDs, when the available bandwidth changes, in the bandwidth a valid BWP is switched by a timer or DCI or a serving cell is deactivated, the transmission setting of the SR for URLLC may also be switched.

At S202, the RRC message and SIB may include setting information related to the compact DCI and the grant-free access. The setting information regarding the grant-free access may include assignment of a multiple access signature resource. Furthermore, the RRC message and the SIB may include setting information regarding BWP.

When the uplink data of the URLLC is generated, the terminal device 20 generates a SR signal for specifying the PUCCH format based on the transmission setting of the URLLC SR (S204). Here, the generation of the uplink data of the URLLC may also mean that the higher layer has provided the data transport block of the URLLC. The terminal device 20 transmits an SR signal on the uplink control channel based on the transmission setting of the URLLC SR (S205). When the base station device 10 detects the SR based on the transmission setting of the URLLC SR, the base station device 10 transmits the UL Grant for the URLLC based on the DCI format to the terminal device 20 in the downlink control channel (S206). Here, the UL Grant for URLLC may indicate that compact DCI may be used, the same DCI may be repeatedly transmitted, the scheduling information indicated by UL Grant, the method of specifying the MCS, and any method specified by the HARQ process number may be different from the eMBB data transmission. The uplink physical channel and the demodulation reference signal are transmitted (initial transmission) (S207). The physical channel for data transmission used by the terminal device 20 may be transmitted based on UL Grant of dynamic scheduling and may be transmitted based on the grant-free access/SPS, or may be transmitted with resources available at data transmission timing (slot or OFDM symbol). The base station device 10 detects an uplink physical channel transmitted by the terminal device 20 (S208). The base station device 10 transmits ACK/NACK to the terminal device 20 using the DCI format on the downlink control channel based on the result of the error detection (S209). When no error is detected at S208, the base station device 10 determines that the received uplink data has been correctly received, and transmits an ACK. On the other hand, when an error is detected at S208, the base station device 10 determines that the received uplink data has been incorrectly received, and transmits a NACK.

Here, the ACK/NACK notification for uplink data transmission using the DCI format uses the HARQ process ID and NDI in the DCI format used in the uplink grant. Specifically, when the DCI format including the HARQ process ID that transmitted the data is detected, the NDI value has changed since the previous NDI value when the DCI format of the same HARQ process ID was detected (when one bit is toggled), it is an ACK (in FIG. 7, the DCI detected at S206 and at S209 indicates the same HARQ process ID, and NDI is toggled, it is an ACK). The detected DCI format becomes an uplink grant of a new data transmission and the NDI value is the same (when there is no toggle), it is a NACK (in FIG. 7, the DCI detected at S206 and S209 indicates the same HARQ process ID, and the NDI is not toggled, it is a NACK). When the NACK DCI format is detected, the detected DCI format becomes an uplink grant for retransmission data transmission.

Furthermore, the DCI format for notifying the uplink grant at S206 may include information of frequency resources (resource blocks, resource block groups, subcarriers) for uplink data transmission, the relative time from the slot n where the DCI format is detected on the PDCCH up to the data transmission timing of the link (for example, if the relative time is k, then slot n+k is the uplink data transmission timing) and the number of OFDM symbols used in the slot of the uplink data transmission timing and start position thereof, and the number of consecutive OFDM symbols. Furthermore, the uplink grant may notify data transmission of a plurality of slots, when a relative time indicating uplink data transmission timing is set to k, and when data transmission of the slot n+k to the slot n+k+n' is permitted, the uplink grant includes the n' information.

When the terminal device detects the uplink grant by the blind decoding of the PDCCH, the terminal device transmits the uplink data at the uplink data transmission timing specified by the uplink grant. Here, the uplink grant has a HARQ process number (for example, 4 bits), and the terminal device performs data transmission of the uplink grant corresponding to the HARQ process number specified by the uplink grant.

Figure 8:
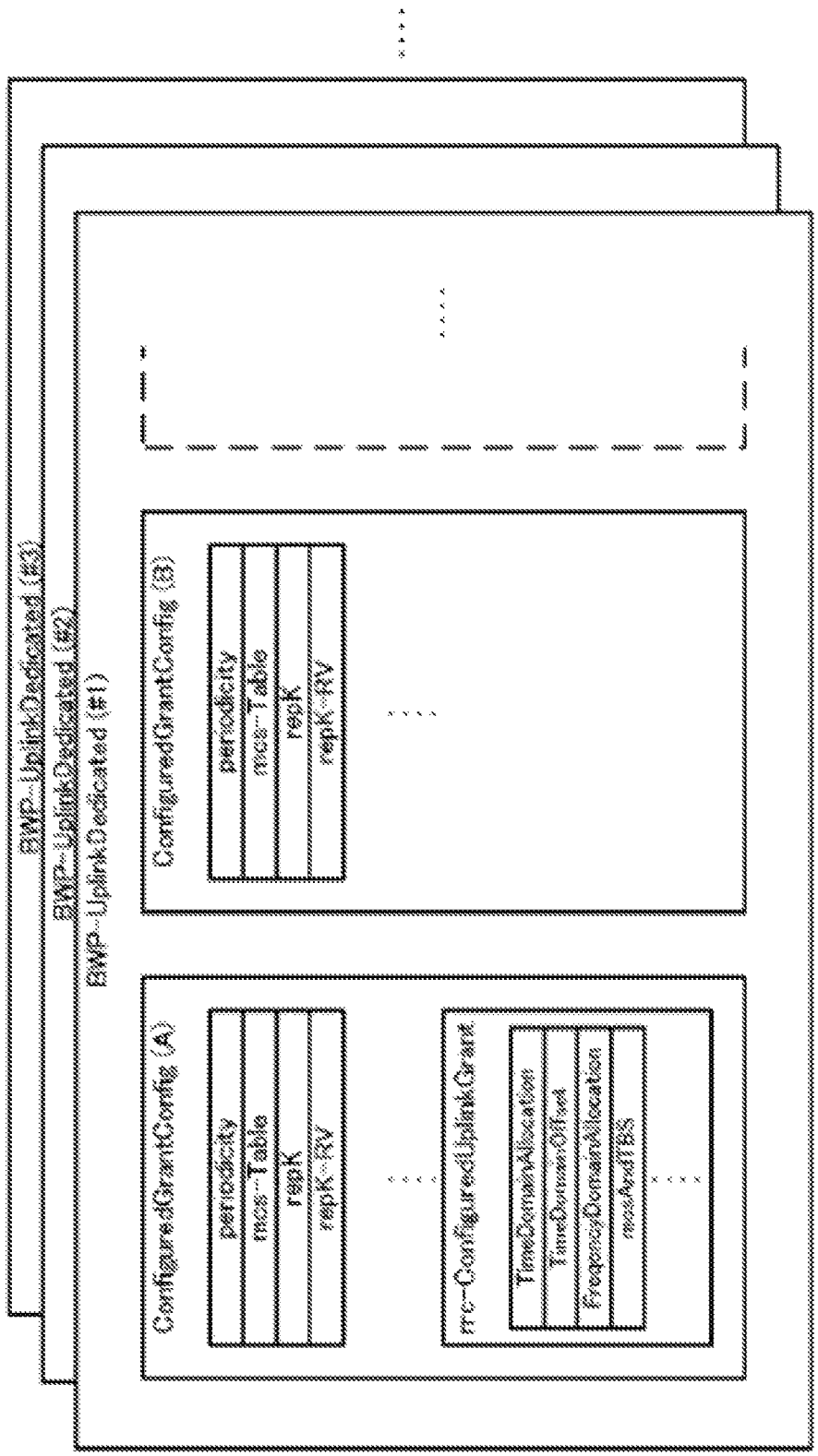
FIG. 8 is a schematic diagram of an example of a RRC message configuration according to a first implementation of the present disclosure.

FIG. 8 is an example of a sequence chart of uplink data transmission related to the configured grant. The differences between FIG. 8 and FIG. 7 are at S303 and S307 to S309, and the differences in the processing of FIG. 7 will be described. At step S202, the terminal device notifies that the URLLC and the eMBB data transmission are supported using UE capability. Here, the difference between the data of the eMBB and the URLLC may be determined based on the uplink grant is received in the DCI format 0_0/0_1; the uplink grant is received in the compact DCI composed of a smaller number of control information bits than the DCI format 0_0/0_1; a table using the high of the lowest spectral efficiency of the MCS table used for data transmission may be used and a table using the low of the lowest spectral efficiency; the MCS table used for data transmission is different (for example, the target block error rate is different); the dynamic scheduling and the UL SPS/the configured grant/the grant-free access; the number of HARQ processes is 16 and the number of HARQ processes is 4; the number of data retransmission is equal to or less than a predetermined value (for example, 1 or less) and the number of retransmission is larger than a predetermined value; the LCH (Logical Channel) has a low priority or a high priority; or the QCI (QoS Class Indicator).

The base station device 10 transmits the setting information related to the configured grant to each of the terminal device 20 using the RRC message, the SIB, and the like (S303). Here, the setting of configured grant may be the above-mentioned ConfiguredGrantConfig. The ConfiguredGrantConfig may or may not include rrc-ConfiguredGrant. Here, when the ConfiguredGrantConfig includes rrc-ConfiguredGrant, data transmission may be performed without the notification (activation) of the DCI format. When the ConfiguredGrantConfig does not include the rrc-ConfiguredGrant, data transmission may be performed after the notification (activation) of the DCI format.

The terminal device transmits (initial transmission) the uplink physical channel and the demodulation reference signal based on the setting information of the configured grant or the configured information of the configured grant and the UL Grant for URLLC indicated by DCI (S307). The terminal device starts a NACK detection timer, which is a configured grant timer, during data transmission using the configured grant setting information. The base station device 10 detects an uplink physical channel using the configured grant transmitted by the terminal device 20 (S308). When the base station device fails to detect the uplink physical channel using the configured grant transmitted by the terminal device, before the configured grant timer times out, the base station device 10 transmits a NACK in the DCI format (S309). In the retransmission processing of transmission using the configured grant, since the processing shifts to dynamic scheduling, the subsequent processing is the same as in those described in FIG. 7, and will not be repeated.

Figure 9:
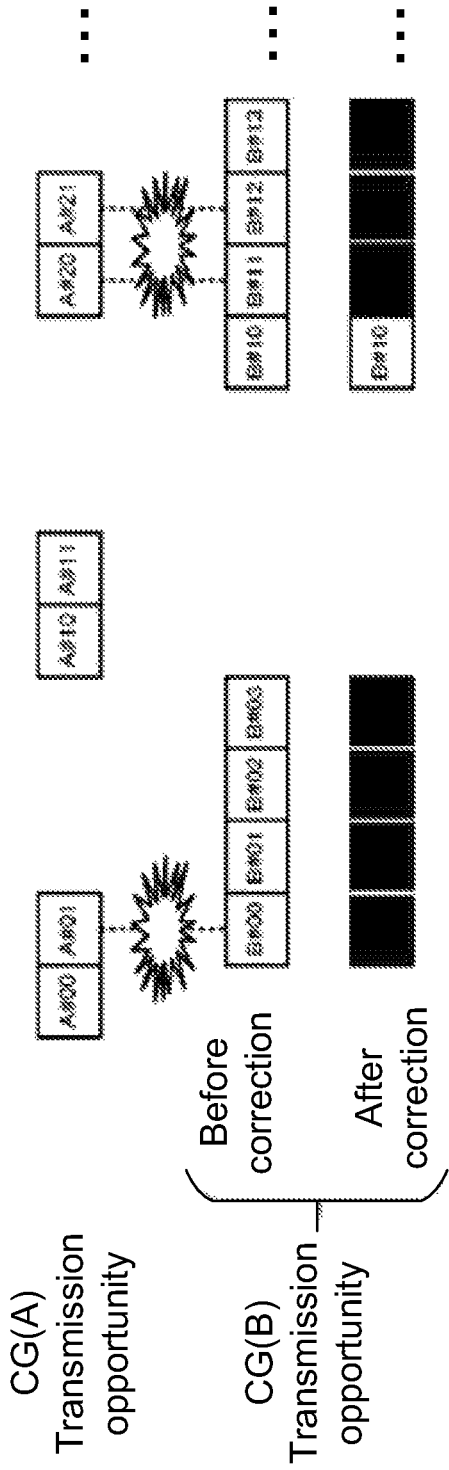
FIG. 9 is a schematic diagram of an example of transmission opportunity allocation of a plurality of configured uplink grants according to a first implementation of the present disclosure.

FIG. 9 is an example of a sequence chart of uplink data transmission related to the configured grant. FIG. 8 is the situation when the data transmission based on configured grant is a NACK, whereas FIG. 9 is the situation when the data transmission based on configured grant is an ACK. The base station device 10 detects an uplink physical channel using the configured grant transmitted by the terminal device 20 (S308). When the base station device 10 successfully detects the uplink physical channel using the configured grant transmitted from the terminal device 20, the base station device 10 does not notify. That is, before the configured grant timer times out, the terminal device does not detect the DCI format and does not detect a NACK, and therefore, an ACK is determined (S310).

FIG. 8 illustrates an example of setting of a plurality of configured uplink grants included in the RRC message. As shown in FIG. 8, the RRC message includes BWP-UplinkDedicated, which is information individual set for each uplink BWP, and also includes information of the number of set BWPs. Each BWP-UplinkDedicated includes setting information of the configured uplink grant, which is ConfiguratedGrantConfig, and is set with the number of configured uplink grants set in each BWP. Here, BWP-UplinkDedicated (#1) is noted, which includes two ConfiguredGrantConfig (A) and ConfiguredGrantConfig (B). Furthermore, in this example, although two ConfiguredGrantConfig are set, it may be set to be one, three or more ConfiguredGrantConfig, or ConfiguredGrantConfig is not set. ConfiguredGrantConfig includes parameters of uplink data transmission using configured uplink grant (Periodicity: cycle, mcs-Table: MCS table, repK: number of retransmissions, repK-RV: RV (Redundancy Version) pattern during retransmission, etc.). Furthermore, there are the situation when ConfiguredGrantConfig includes rrc-ConfiguredUplinkGrant, and when ConfiguredGrantConfig does not include rrc-ConfiguredUplinkGrant. As described above, when ConfiguredGrantConfig includes rrc-ConfiguredUplinkGrant, the ConfiguredGrantConfig is the configured UL grant type 1, and when ConfiguredGrantConfig does not include rrc-ConfiguredUplinkGrant, the ConfiguredGrantConfig is the configured UL grant type 1. The rrc-ConfiguredUplinkGrant includes parameters related to uplink data transmission according to configured UL grant type 1 (TimeDomainAllocation: transmission resource allocation along the time-axis, TimeDomainOffset: transmission start offset along the time-axis, TimeDomainAllocation: transmission resource allocation along the frequency-axis, mcsAndTBS: modulation scheme/coding rate and transport block size, etc.). When the ConfiguredGrantConfig does not include rrc-ConfiguredUplinkGrant, that is, in the situation of configured uplink grant type 2, a part or all of contents of the rrc-ConfiguredUplinkGrant is notified by the DCI separately. Furthermore, the parameters included in the ConfiguredGrantConfig and the rrc-ConfiguredUplinkGrant are not limited to those described in FIG. 8, and other parameters may also be included, or no parameters are included. In this situation, a predetermined value may be implicitly used. Furthermore, the parameter names are not limited to these. Furthermore, when a plurality of ConfiguredGrantConfigs is set, each of the parameters included may be set to different values for each ConfigurableGrantConfig, or the same values may be set.

FIG. 9 illustrates an example, that is, the terminal device 20 allocates transmission resources (transmission opportunities) using a plurality of configured uplink grants according to the RRC messages of a plurality of ConfiguredGrantConfig included in one uplink BWP setting (BWP- UplinkDedicated). Here, two configured uplink grants, a configured uplink grant A and a configured uplink grant B, are set. In a CG (Configured UL Grant) (A) transmission opportunity and a CG (B) transmission opportunity, each square represents a transmission opportunity (TO) using resources for transmitting uplink data assigned by each configured uplink grant. For the ease of understanding, the character strings in the squares are provided for identifying each transmission opportunity. For example, "A #00" indicates the $0^{th}$ transmission opportunity of the 0th retransmission number of the uplink data of the configured uplink grant A. Furthermore, one uplink data transmission resource of each configured uplink grant is allocated with transmission opportunities of the number of continuous retransmissions. The retransmission number indicates the number of retransmissions times of one uplink data, which does not indicate the redundancy version (RV) itself. The RV uses a value corresponding to the retransmission number from the RV pattern specified by the RRC message.

With respect to the setting sequence of each configured uplink grant, each transmission opportunities may conflict with each other in time. In the example of FIG. 9, A #10 and B #00, A #20 and B #11, and A #21 and B #12 conflict in time. When transmission opportunities conflict, although both transmission opportunities may be transmitted at the same time, it is not ideal in view of increasing PAPR. Therefore, there is a need of a mechanism to select one of them for transmission. FIG. 9 illustrate an example, that is, the selection is performed according to a sequence of the configured uplink grant A and the configured uplink grant B, and when a conflict of the transmission opportunity occurs, the transmission opportunity of the configured uplink grant B that is later in the sequence together with the later retransmission are skipped. Furthermore, regarding the CG (B) setting, the upper row shows the transmission opportunity before correction, that is, the transmission opportunity according to the setting of the RRC message, and the lower row shows the transmission opportunity after correction, that is, the transmission opportunity after skipping the sequence at the time of conflict as described above. Furthermore, the transmission opportunity that is skipped is represented by a black square. According to the sequence described above, all of B #00 to B #03 including B #00 that conflicts with A #01 are skipped. Also, B #11 and B #12 that conflict with A #20 and A #21, respectively, are skipped, and the transmission opportunities of retransmission onwards are also skipped. Furthermore, in FIG. 9, all transmission opportunities from B #00 to B #03 are skipped and no transmission is performed. Therefore, the transmission is controlled to be performed at the next transmission opportunity B #10 and onwards.

When a plurality of transmission opportunities of configured uplink grants conflict, the following methods for determining the prioritized transmission sequence of the transmission opportunities may be considered. For example, a method may use the setting sequence of the ConfiguredGrantConfig in the RRC message as the sequence. Alternatively, a method may base on the parameters in each ConfiguredGrantConfig to determine the sequence. For example, the MCS table may prioritize the configured uplink grant set in the URLLC MCS table. Furthermore, the following method may also be used, that is, a parameter indicating a priority may be introduced into each ConfiguredGrantConfig, and the sequence may be determined according to the priority.

As described above, according to the present implementation, when performing uplink data transmission using a plurality of configured uplink grants in one serving cell or one BWP, even when the transmission opportunities of the respective configured uplink grants conflict with each other, transmission can be performed appropriately.

(Second Implementation)

Figure 10:
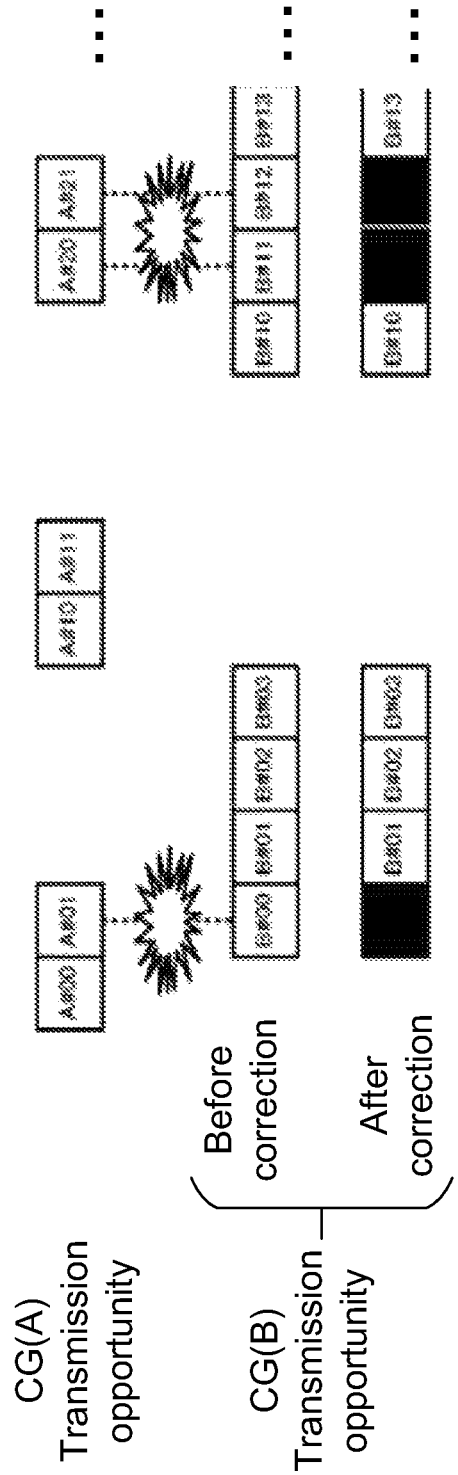
FIG. 10 is a schematic diagram of an example of transmission opportunity allocation of a plurality of configured uplink grants according to a second implementation of the present disclosure.

In the present implementation, an example of the following method is described. The method relates to that, when a plurality of transmission opportunities of configured uplink grants conflict, skipping only the conflicting transmission opportunities of configured uplink grants lower in the sequence. FIG. 10, similar to FIG. 9, illustrates the situation when the configured uplink grant A and the configured uplink grant B are set with the same conflict between the transmission opportunities. Firstly, when transmission opportunities A #01 and B #00 conflict, B #00 is skipped. The subsequent B #01 to B #03 do not conflict each other, and therefore, they are used for transmission and not skipped. Furthermore, the retransmission number remains unchanged. Similarly, B #11 and B #12 that conflict with A #20 and A #21 are skipped, however, the retransmission number of B #10 and B #13 remain the same.

As described above, according to the present implementation, when performing uplink data transmission using a plurality of configured uplink grants in one serving cell or one BWP, even when the transmission opportunities of the respective configured uplink grants conflict with each other, transmission can be performed appropriately.

(Third Implementation) In the present implementation, an example of the following method is described. The method relates to that, when a plurality of transmission opportunities of configured uplink grants conflict, shifting the conflicting transmission opportunities of configured uplink grants lower in the sequence. FIG. 11, similar to FIG. 10, illustrates the situation when the configured uplink grant A and the configured uplink grant B are set with the same conflict between the transmission opportunities. Firstly, when transmission opportunities A #01 and B #00 conflict, the transmission opportunity B #00 is shifted to the timing at the end of transmission opportunity of A #01, which is the timing of the transmission opportunity B #01. Thereafter, transmission opportunity B #01 is shifted to the timing of B #02, and B #02 is shifted to the timing of B #03, respectively. Since the transmission opportunity B #03 before correction cannot be shifted, it is canceled. Similarly, B #11 that conflicts with A #20 is shifted to the timing at the end of A #21, which is the timing of transmission opportunity B #13. B #12 and B #13 that conflict with A #21 cannot be shifted, and therefore, they are canceled.

As described above, according to the present implementation, when performing uplink data transmission using a plurality of configured uplink grants in one serving cell or one BWP, even when the transmission opportunities of the respective configured uplink grants conflict with each other, transmission can be performed appropriately.

(Forth Implementation)

In the present implementation, an example of the following method is described. The method relates to that, when a plurality of transmission opportunities of configured uplink grants conflict, giving priority to a transmission opportunity of a preceding configured uplink grant. FIG. 12, similar to FIGS. 9, 10 and 11, illustrates the situation when the configured uplink grant A and the configured uplink grant B are set with the same conflict between the transmission opportunities. Furthermore, regarding the CG (B) setting, the lower row shows the transmission opportunity before correction, that is, the transmission opportunity according to the setting of the RRC message, and the upper row shows the transmission opportunity after correction, that is, the transmission opportunity after skipping the sequence at the time of conflict as described above. Firstly, when transmission opportunities A #01 and B #00 conflict, the transmission opportunity of uplink data transmission of configured uplink grant A started from A #00 has been given priority, therefore, B #00 is skipped. B #01, B #02 and B #03 used in the remaining retransmission are also skipped. Furthermore, the uplink data of configured uplink grant B, which was to be transmitted at transmission opportunities B #00 to B #03, is rescheduled for transmission at the next transmission opportunity (in this implementation, that is transmission opportunity B #10 to B #13). Next, when transmission opportunities A #20 and B #11 and A #21 and B #12 conflict with each other, the priority is given to the transmission opportunity of uplink data transmission of configured uplink grant B started from B #10. Therefore, transmission opportunities A #20 and A #21 are skipped. Furthermore, the uplink data of configured uplink grant A that was to be transmitted at transmission opportunities A #20 and A #21 is rescheduled for transmission at the next transmission opportunity.

As described above, according to the present implementation, when performing uplink data transmission using a plurality of configured uplink grants in one serving cell or one BWP, even when the transmission opportunities of the respective configured uplink grants conflict with each other, transmission can be performed appropriately.

(Fifth Implementation)

Figure 13:
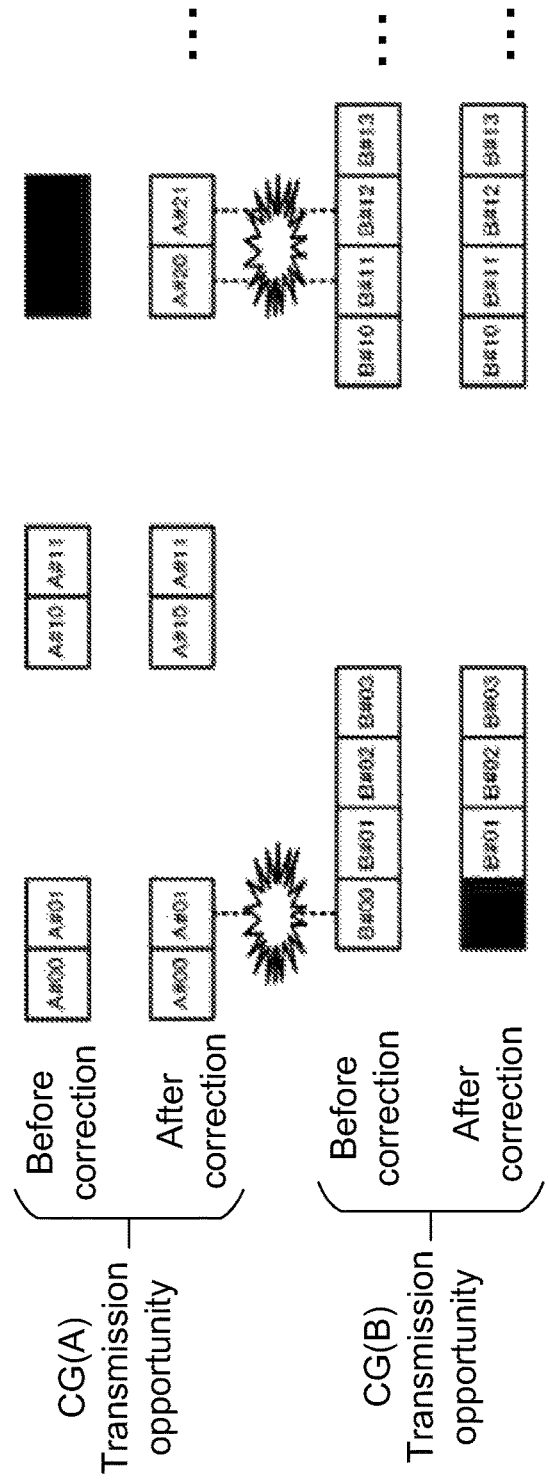
FIG. 13 is a schematic diagram of an example of transmission opportunity allocation of a plurality of configured uplink grants according to a fifth implementation of the present disclosure.

In the present implementation, an example of the following method is described. The method relates to that, when a plurality of transmission opportunities of configured uplink grants conflict, giving priority to a transmission opportunity of a preceding configured uplink grant and skipping only the conflicting transmission opportunity. FIG. 13, similar to FIG. 12, illustrates the situation when the configured uplink grant A and the configured uplink grant B are set with the same conflict between the transmission opportunities. Firstly, when transmission opportunities A #01 and B #00 conflict, the transmission opportunity of uplink data transmission of configured uplink grant A started from A #00 has been given priority, therefore, B #00 is skipped. However, transmission opportunities B #01, B #02, and B #03 that have no conflict are directly used for uplink data transmission of configured uplink grant B. Next, when transmission opportunities A #20 and B #11 and A #21 and B #12 conflict with each other, the priority is given to the transmission opportunity of uplink data transmission of configured uplink grant B started from B #10. Therefore, transmission opportunities A #20 and A #21 are skipped. Furthermore, the uplink data of configured uplink grant A that was to be transmitted at transmission opportunities A #20 and A #21 is rescheduled for transmission at the next transmission opportunity.

As described above, according to the present implementation, when performing uplink data transmission using a plurality of configured uplink grants in one serving cell or one BWP, even when the transmission opportunities of the respective configured uplink grants conflict with each other, transmission can be performed appropriately.

(Sixth Implementation)

Figure 14:
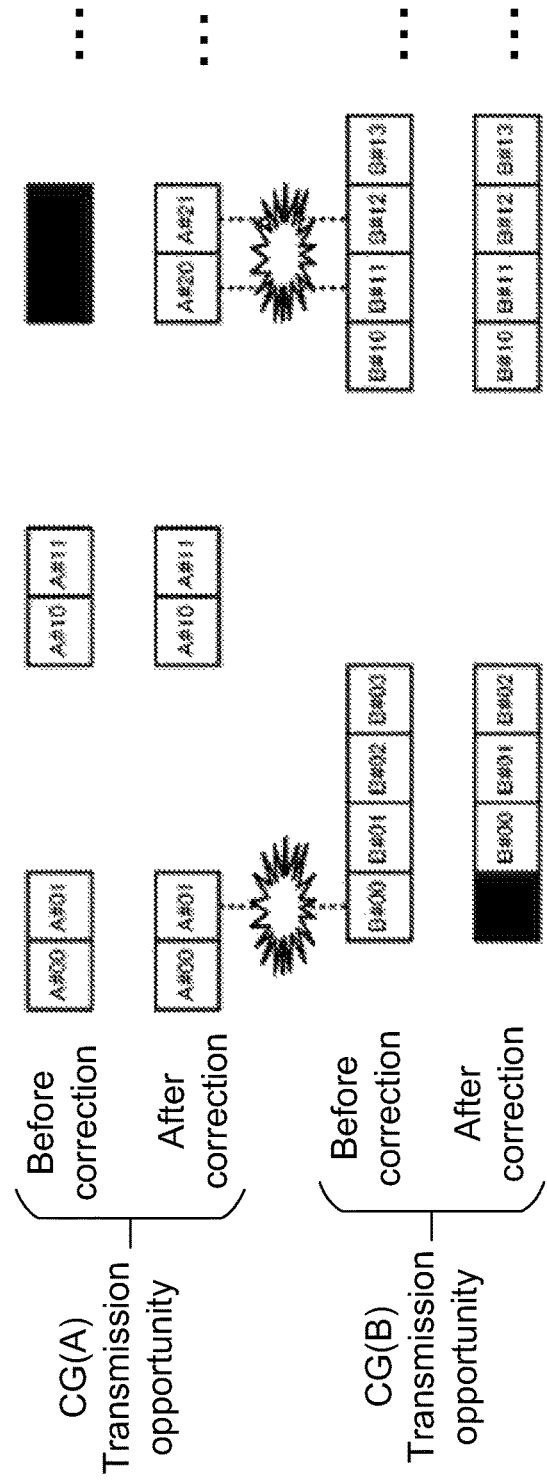
FIG. 14 is a schematic diagram of an example of transmission opportunity allocation of a plurality of configured uplink grants according to a sixth implementation of the present disclosure.

In the present implementation, an example of the following method is described. The method relates to that, when a plurality of transmission opportunities of configured uplink grants conflict, giving priority to a transmission opportunity of a preceding configured uplink grant and shifting the conflicting transmission opportunity. FIG. 14, similar to FIG. 12, illustrates the situation when the configured uplink grant A and the configured uplink grant B are set with the same Conflict between the transmission opportunities. Firstly, when transmission opportunities A #01 and B #00 conflict, the transmission opportunity of uplink data transmission of configured uplink grant A started from A #00 has been given priority, therefore, the transmission opportunity B #00 is shifted to the timing at the end of transmission opportunity of A #01, which is the timing of the transmission opportunity B #01. Thereafter, transmission opportunity B #01 is shifted to the timing of B #02, and B #02 is shifted to the timing of B #03, respectively. Since the transmission opportunity B #03 before correction cannot be shifted, it is canceled. Next, when transmission opportunities A #20 and B #11 and A #21 and B #12 conflict with each other, priority is given to the transmission opportunity of uplink data transmission of configured uplink grant B started from B #10. However, since A #20 and A #21 cannot be shifted, they are canceled. Furthermore, the uplink data of configured uplink grant A that was scheduled to be transmitted at transmission opportunities A #20 and A #21 is rescheduled for transmission at the next transmission opportunity.

As described above, according to the present implementation, when performing uplink data transmission using a plurality of configured uplink grants in one serving cell or one BWP, even when the transmission opportunities of the respective configured uplink grants conflict with each other, transmission can be performed appropriately.

(Seventh Implementation)

Figure 15:
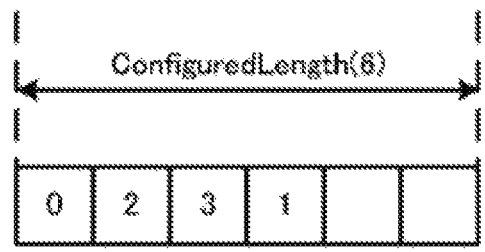
FIG. 15 is a schematic diagram of an example of a method of determining a length of transmission opportunity of a plurality of configured uplink grants according to a seventh implementation of the present disclosure.
Figure 15:
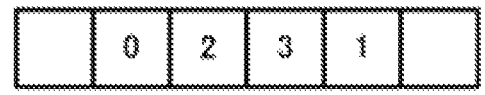
Figure 15:
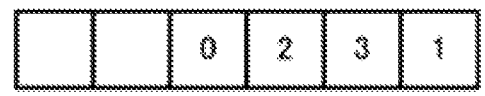
Figure 15:
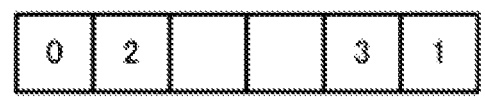

Next, an example of the following method is described. The method relates to allocatinng the length of a transmission opportunity used for transmitting one uplink data of the configured uplink grant, wherein the length is greater than the number of retransmission. In FIG. 15, the length of the transmission opportunity (the number of transmission opportunities) used for transmitting one uplink data of the configured uplink grant is determined by ConfiguredLength. Here, the number is set to 6, but not limited to this. The value of the ConfiguredLength may be notified by an RRC message or DCI, or a value that is implicitly determined in advance may be used. Furthermore, as an example, the number of retransmission (repK) is set to 4, and the RV pattern (repK-RV) is set to "0231." In this situation, the number of RVs (numRV) is 4. The retransmission of uplink data may use a number of transmission opportunities, the number being any repK in all the transmission opportunities allocated to one uplink data transmission. In FIG. 15, as an example, illustrates 4 transmission modes a to d. Furthermore, the squares represent individual transmission opportunities, and the numbers in the squares represent RV. Similarly to transmission modes a to c, any consecutive transmission opportunities may be used; or discontinuous transmission opportunities may be used as the transmission mode d. At this time, the RV used in each transmission opportunity uses a value corresponding to the retransmission number from the RV mode.

Figure 16:
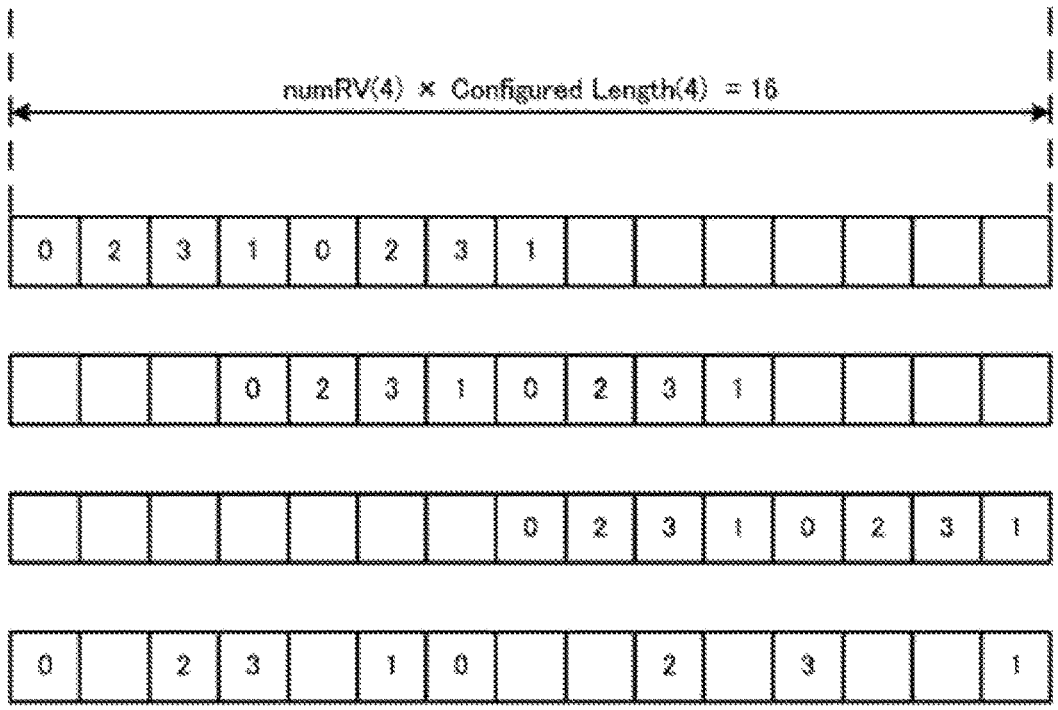
FIG. 16 is a schematic diagram of an example of a method of determining a length of transmission opportunity of a plurality of configured uplink grants according to a seventh implementation of the present disclosure.
Figure 17:
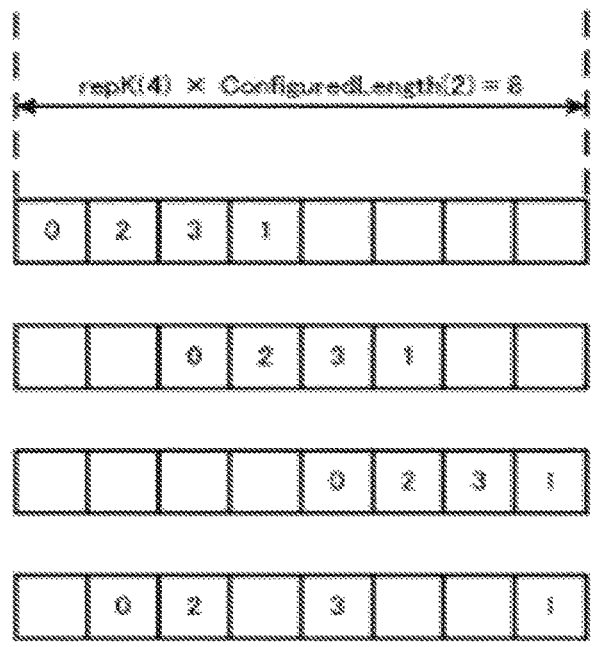
FIG. 17 is a schematic diagram of an example of a method of determining a length of transmission opportunity of a plurality of configured uplink grants according to a seventh implementation of the present disclosure.
Figure 18:
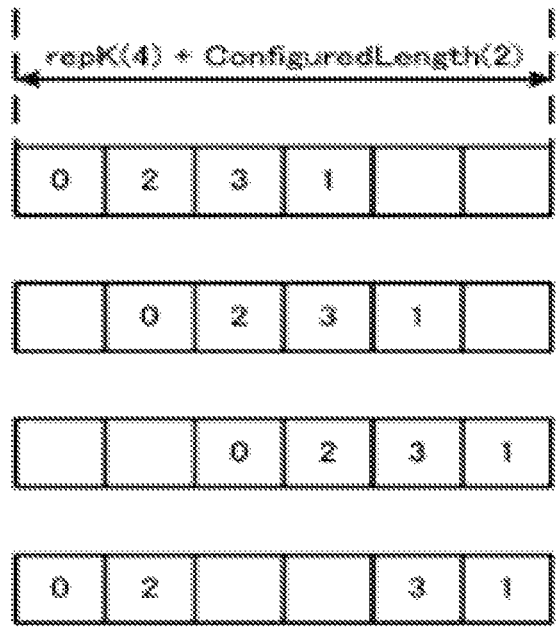
FIG. 18 is a schematic diagram of an example of a method of determining a length of transmission opportunity of a plurality of configured uplink grants according to a seventh implementation of the present disclosure.

The method of determining the length of the transmission opportunity used for one uplink data transmission is not limited to the method disclosed in FIG. 15. For example, in the example of FIG. 16, that is, the number obtained by multiplying the number of RVs (numRV) by the ConfiguredLength is set to be the length of the transmission opportunity (the number of transmission opportunities) used for transmitting one uplink data of configured uplink grant. Furthermore, in the example of FIG. 17, that is, the number obtained by multiplying the number of repetitions (repK) by ConfiguredLength is set to be the length of the transmission opportunity (the number of transmission opportunities) used for transmitting one uplink data of configured uplink grant. Furthermore, in the example of FIG. 18, that is, the number obtained by adding the number of repeated transmissions (repK) to ConfiguredLength is set to be the length of the transmission opportunity (the number of transmission opportunities) used for transmitting one uplink data of configured uplink grant. As such, there are various methods for determining the length of the transmission opportunity (the number of transmission opportunities) used for one uplink data transmission of configured uplink grant, which is not limited to the above examples.

Figure 19:
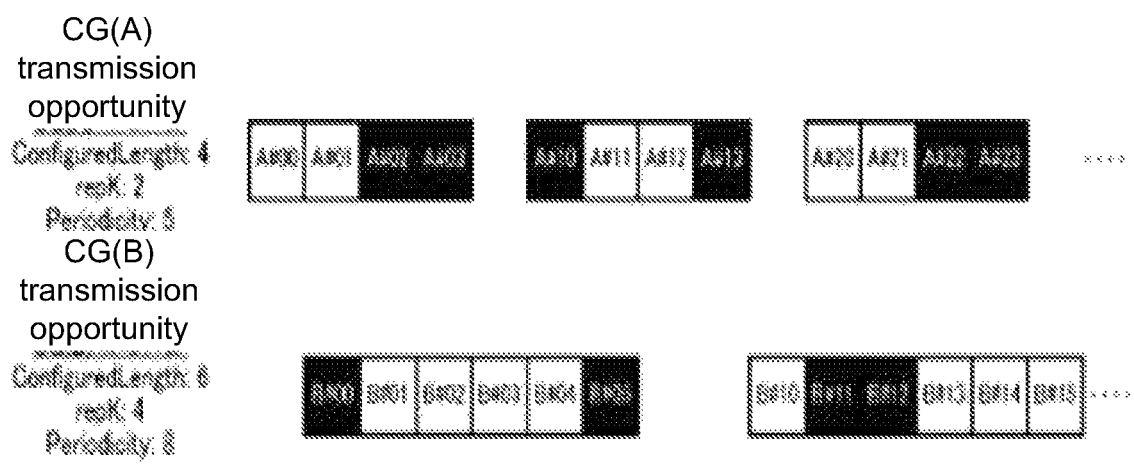
FIG. 19 is a schematic diagram of an example of transmission opportunity allocation of a plurality of configured uplink grants according to a seventh implementation of the present disclosure.

An example of the present disclosure relating to a method for avoiding conflict when transmission opportunities of a plurality of configured uplink grants conflict is described. FIG. 19 illustrates that the terminal device 20 allocates a transmission resource (transmission opportunity) with a plurality of configured uplink grants according to an RRC message of a plurality of ConfiguredGrantConfig included in one uplink BWP setting (BWP-UplinkDedicated) and a ConfiguredLength. FIG. 19 is an example that two configured uplink grants (CG) A and B are set. CG (A) is set with ConfiguredLength: 4, repK: 2, Periodicity: 5, and CG (B) is set with Configured Length: 6, repK: 4, Periodicity: 8. The squares represent each transmission opportunity, the white squares represent transmission opportunities actually used for transmission, and the black squares represent transmission opportunities not used for transmission. For convenience, the numbers in the squares are provided to identify each transmission opportunity. For example, "A #12" represents the second transmission opportunity of the transmission opportunities used for the first uplink data transmission of configured uplink grant A. As shown in FIG. 19, selection is performed appropriately to not create any conflicts between the transmission opportunity of configured uplink grant A and the transmission opportunity of configured uplink grant B that is actually used for uplink data transmission, and thereby, conflict of the transmission opportunity may be avoided.

As described above, according to the present implementation, when performing uplink data transmission using a plurality of configured uplink grants in one serving cell or one BWP, even when the transmission opportunities of the respective configured uplink grants conflict with each other, transmission can be performed appropriately.

Furthermore, the implementations of the present disclosure may be applied realized by combining multiple implementations, or may be realized by each implementation as described.

The program that operates on the device according to the present disclosure may be a program that controls a Central Processing Unit (CPU) and the like to cause a computer to function to realize the functions of the above implementations according to the present disclosure. The program or information processed by the program, during processing, is temporarily read into a volatile memory, such as a Random Access Memory (RANI), or is stored in a non-volatile memory, such as a flash memory or a Hard Disk Drive (HDD), and may be read, corrected or written by the CPU as required.

Furthermore, a part of the device in the above implementation may be realized by a computer. In this situation, a program for realizing the functions of the implementations may be recorded on a computer-readable recording medium. The program may be realized by causing a computer system to read and execute the program recorded on the recording medium. Here, the "computer system" is a computer system built in the device, and includes an operating system and hardware, such as peripheral devices. The "computer-readable recording medium" may be any one of a semiconductor recording medium, an optical recording medium, a magnetic recording medium, and the like.

Furthermore, the "computer system," when using the WWW (World Wide Web) system, also includes a homepage provided environment (or display environment).

Furthermore, a "computer-readable recording medium" includes a medium that may be dynamically stored with a program temporarily, such as a communication line for transmitting a program through a network, like the Internet or a communication line such as a telephone line; or a medium stored with a program for a certain period of time, such as a volatile memory in a computer system of a server or a client. Furthermore, the above-mentioned program may be for realizing a part of the above-mentioned functions, or may be for realizing the above-mentioned functions in combination with a program already recorded in a computer system.

Furthermore, various characteristics or function modules used in the equipment disclosed in the implementations herein may be installed or implemented by electronics or circuits such as a monolithic or multiple-chip integrated circuit. The electronics designed for implementing the functions disclosed herein may include general processors, a digital signal processor (DSP), Applications Specific Integrated Circuitry (ASIC), Field Programmable Gate Arrays (FPGAs) or any other programmable logic devices, discrete gate or transistor logic, discrete hardware assembly, or any combination of the disclosed devices. A general processor may be a microprocessor, or any present processor, controller, microcontroller, or state machine. The disclosed electronics may be digital electronics or analog electronics. As semiconductor technology continues to improve, it is noted that there may be new integrated circuit technology replacing present integrated circuits, one or more implementations of the present disclosure may be implemented with the new integrated circuit technology.

It is noted that, the present disclosure is not limited to the disclosed implementations. Although various examples are disclosed in each implementation, it should be noted that the present disclosure is not limited thereto. Fixed or non-mobile electronic equipment installed indoor or outdoor may be in a form of terminal equipment or communications equipment. For example, the electronic equipment may be Audio-Video equipment, kitchen equipment, cleaning equipment, air-conditioner, office equipment, vending machines, other home appliances, terminal devices or communications devices.

As above, the implementations of the present disclosure are disclosed in detail with reference to the accompanying drawings. However, the implementations are not limited to the disclosed implementations. The present disclosure also includes design variations without departing from the scope or spirit of the disclosed concepts. Furthermore, the present disclosure also encompasses modifications within the scope of the claims, implementations suitably combining various disclosed implementations. Additionally, the disclosed implementations may have component substitutions that have similar effect.

INDUSTRIAL APPLICABILITY

The present disclosure is applicable for use in wired and wireless communications systems and communication devices.

What is claimed is:

1. A terminal device of a communication system, the communication system further including a base station device, the terminal device comprising:
   at least one processor; and
   at least one memory coupled to the at least one processor, the at least one memory storing one or more computer-executable instructions that, when executed by the at least one processor, cause the terminal device to:
   determine an uplink data transmission setting according to a radio resource control (RRC) message; and
   transmit uplink data according to the determined uplink data transmission setting, wherein:
   the RRC message includes setting information of a plurality of configured uplink grants,
   the setting information includes at least first and second configured uplink grants for each of at least one bandwidth part (BWP),
   the setting information further includes information related to a transmission interval of the first configured uplink grant and a transmission interval of the second configured uplink grant, and
   the computer-executable instructions, when executed by the at least one processor, further cause the terminal device to:
      set the at least first and second configured uplink grants for each of the at least one BWP according to the setting information for each of the at least one BWP included in the RRC message; and
      when the at least a part of the transmission interval of the first configured uplink grant and the at least a part of the transmission interval of the second configured uplink grant overlap each other, determine an order according to a priority included in the setting information, and interrupt, according to the order, uplink data transmission of the first configured uplink grant or uplink data transmission of the second configured uplink grant.

2. The terminal device according to claim 1, wherein the interrupting, according to the order, comprises interrupting the uplink data transmission of the first configured uplink grant, wherein the computer-executable instructions, when executed by the at least one processor, further cause the terminal device to:
   perform the uplink data transmission of the second configured uplink grant; and
   after completing the uplink data transmission of the second configured uplink grant resume the uplink data transmission of the first configured uplink grant.

3. The terminal device according to claim 2, wherein the computer-executable instructions, when executed by the at least one processor, further cause the terminal device to:
   after resuming the uplink data transmission of the first configured uplink grant, perform the uplink data transmission of the first configured uplink grant until the transmission interval of the first configured uplink grant ends.

4. The terminal device according to claim 2, wherein the computer-executable instructions, when executed by the at least one processor, further cause the terminal device to:
   after resuming the uplink data transmission of the first configured uplink grant, perform the uplink data transmission of the first configured uplink grant until a setting number of retransmissions of the first configured uplink grant is reached.

5. The terminal device according to claim 1, wherein the computer-executable instructions, when executed by the at least one processor, further cause the terminal device to:
   determine the order further according to a modulation and coding scheme (MCS) table setting or other parameters included in the setting information.

6. The terminal device according to claim 1, wherein the computer-executable instructions, when executed by the at least one processor, further cause the terminal device to:
   determine the order further according to a setting order of the setting information.

7. A method performed by a terminal device of a communication system, the communication system further including a base station device, the method comprising:
   determining an uplink data transmission setting according to a radio resource control (RRC) message; and
   transmitting uplink data according to the determined uplink data transmission setting, wherein:
   the RRC message includes setting information of a plurality of configured uplink grants,
   the setting information includes at least first and second configured uplink grants for each of at least one bandwidth part (BWP),
   the setting information further includes information related to a transmission interval of the first configured uplink grant and a transmission interval of the second configured uplink grant, and
   the method further comprises:
      setting the at least first and second configured uplink grants for each of the at least one BWP according to the setting information for each of the at least one BWP included in the RRC message; and
      when the at least a part of the transmission interval of the first configured uplink grant and the at least a part of the transmission interval of the second configured uplink grant overlap each other, determining an order according to a priority included in the setting information, and interrupting, according to the order, uplink data transmission of the first configured uplink grant or uplink data transmission of the second configured uplink grant.

8. The method according to claim 7, wherein the interrupting, according to the order, comprises interrupting the uplink data transmission of the first configured uplink grant, the method further comprising:
   performing the uplink data transmission of the second configured uplink grant; and
   after completing the uplink data transmission of the second configured uplink grant, resuming the uplink data transmission of the first configured uplink grant.

9. The method according to claim 8, further comprising:
   after resuming the uplink data transmission of the first configured uplink grant, performing the uplink data transmission of the first configured uplink grant until the transmission interval of the first configured uplink grant ends.

10. The method according to claim 8, further comprising:
   after resuming the uplink data transmission of the first configured uplink grant, performing the uplink data transmission of the first configured uplink grant until a setting number of retransmissions of the first configured uplink grant is reached.

11. The method according to claim 7, further comprising:
   determining the order further according to a modulation and coding scheme (MCS) table setting or other parameters included in the setting information.

12. The method according to claim 7, further comprising:
determining the order further according to a setting order of the setting information.

* * * * *